(12) United States Patent
Leleannec et al.

(10) Patent No.: US 12,015,800 B2
(45) Date of Patent: Jun. 18, 2024

(54) MMVD AND SMVD COMBINATION WITH MOTION AND PREDICTION MODELS

(71) Applicant: INTERDIGITAL MADISON PATENT HOLDINGS, SAS, Paris (FR)

(72) Inventors: Fabrice Leleannec, Mouazé (FR); Franck Galpin, Thorigne-Fouillard (FR); Edouard Francois, Bourg des Comptes (FR)

(73) Assignee: INTERDIGITAL MADISON PATENT HOLDINGS, SAS, Paris (FR)

(*) Notice: Subject to any disclaimer, the term of this patent is extended or adjusted under 35 U.S.C. 154(b) by 73 days.

(21) Appl. No.: 17/414,598

(22) PCT Filed: Dec. 16, 2019

(86) PCT No.: PCT/US2019/066448
§ 371 (c)(1),
(2) Date: Jun. 16, 2021

(87) PCT Pub. No.: WO2020/131659
PCT Pub. Date: Jun. 25, 2020

(65) Prior Publication Data
US 2022/0078488 A1 Mar. 10, 2022

(30) Foreign Application Priority Data
Dec. 17, 2018 (EP) .................................... 18306708

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/109* (2014.11);
(Continued)

(58) Field of Classification Search
CPC ............... H04N 19/105; H04N 19/109; H04N 19/176; H04N 19/52; H04N 19/573; H04N 19/577; H04N 19/70
See application file for complete search history.

(56) References Cited

U.S. PATENT DOCUMENTS

| | | | |
|---|---|---|---|
| 2013/0070855 A1* | 3/2013 | Zheng | H04N 19/52 375/E7.125 |
| 2013/0163663 A1* | 6/2013 | Yu | H04N 19/159 375/240.12 |

(Continued)

FOREIGN PATENT DOCUMENTS

WO 2020/117619 A1 6/2020

OTHER PUBLICATIONS

Ghaznavi-Youv Alari, Ramin et al. "CE4-related: Merge mode with Regression based Motion Vector Field (RMVF) (JVET-U) 171 )" Joint Video Experts Team (JVET) of ITU-T SG 16 WP 3 and ISO/IEC JTC 1/SC 29/WG 11 12th Meeting: Macao, CN, Oct. 6, 2018 (Oct. 6, 2018). (Year: 2018).*

(Continued)

*Primary Examiner* — Anner N Holder
(74) *Attorney, Agent, or Firm* — CONDO ROCCIA KOPTIW LLP

(57) ABSTRACT

The general aspects extend motion modes, such as merge with motion vector difference, and symmetrical motion vector difference, to motion models beyond a simple translational model, for example in combination with merge and alternative temporal motion vector prediction modes. Embodiments extend the use of MMVD and SMVD motion (Continued)

vector coding tools to all the motion model derivation methods and temporal prediction methods that are supported in proposed video standards, so as to increase the overall compression performance. Particular embodiments describe combining MMVD or SMVD with the affine motion model, the ATMVP motion model, the planar motion model, the regressive motion field, the triangle-partition-based motion model, the GBI temporal prediction method, the LIC temporal prediction method and the Multi-hypothesis prediction method.

23 Claims, 37 Drawing Sheets

(51) Int. Cl.
    *H04N 19/109*     (2014.01)
    *H04N 19/176*     (2014.01)
    *H04N 19/52*     (2014.01)
    *H04N 19/577*     (2014.01)

(52) U.S. Cl.
    CPC ........... *H04N 19/176* (2014.11); *H04N 19/52* (2014.11); *H04N 19/577* (2014.11)

(56) References Cited

U.S. PATENT DOCUMENTS

| | | | | |
|---|---|---|---|---|
| 2013/0322531 A1* | 12/2013 | Chen | ...................... | H04N 19/30 375/240.12 |
| 2014/0078251 A1* | 3/2014 | Kang | .................... | H04N 19/597 348/43 |
| 2014/0146876 A1* | 5/2014 | Takehara | ............. | H04N 19/147 375/240.02 |
| 2015/0146103 A1* | 5/2015 | Koo | ........................ | H04N 23/80 348/607 |
| 2017/0019671 A1* | 1/2017 | Lim | ........................ | H04N 19/52 |
| 2019/0007699 A1* | 1/2019 | Liu | ........................ | H04N 19/172 |
| 2019/0058896 A1* | 2/2019 | Huang | ................. | H04N 19/159 |
| 2019/0200040 A1* | 6/2019 | Lim | ...................... | H04N 19/176 |
| 2019/0246118 A1* | 8/2019 | Ye | ........................ | H04N 19/176 |
| 2020/0288150 A1* | 9/2020 | Jun | ........................ | H04N 19/44 |
| 2021/0160525 A1* | 5/2021 | Zhang | ................. | H04N 19/109 |
| 2021/0243476 A1* | 8/2021 | Ko | ........................ | H04N 19/70 |

OTHER PUBLICATIONS

Chen et al., "Algorithm Description for Versatile Video Coding and Test Model 3 (VTM 3)", Joint Video Experts Team (JVET) of ITU-T SG 16 WP 3 and ISO/IEC JTC 1/SC 29/WG 11, Document: JVET-L1002-v1, 12th Meeting: Macao, China, Oct. 3-12, 2018, 37 pages.

Jeong et al., CE4 Ultimate Motion Vector Expression in JVET-J0024 (Test 4.2.9), 11. JVET Meeting, Jul. 11, 2018-Jul. 18, 2018, Ljubljana, SI, (The Joint Video Exploration Team of ISO/IEC JTC1/SC29/WG11 and ITU-T SG.16), Document: JVET-K0115-v4.

Chen et al., Algorithm Description of Joint Exploration Test Model 7 (JEM 7), Joint Video Exploration Team (JVET) of ITU-T SG 16 WP 3 and ISO/IEC JTC 1/SC 29/WG 11 7th Meeting: Torino, IT, Jul. 13-21, 2017, Document: JVET-G1001-v1.

Bross, et al., Versatile Video Coding (Draft 3), 124. JVET Meeting of ITU-T SG 16 WP3 and ISO/IEC JTC 1/SC 29/WG 11, 12th Meeting: Macao, CN, Oct. 3-12, 2018, Document: JVET-L1001-V6.

Chen et al., "CE4: Symmetrical MVD Mode (Test 4.5.1)", JVET-L0370-V1, Huawei Technologies Co., Ltd., Joint Video Experts Team JVET of ITU-T SG 16 WP 3 and ISO/IEC JTC 1/SC 29/WG 11, 12th Meeting: Macao, CN, Oct. 3-12, 2018, pp. 1-4.

Hsiao et al., "CE4.4.12: Pairwise Average Candidates", JVET-L0090-v2, MediaTek Inc., Joint Video Experts Team JVET of ITU-T SG 16 WP 3 and ISO/IEC JTC 1/SC 29/WG 11, 12th Meeting: Macao, CN, Oct. 3-12, 2018, pp. 1-18.

ITU-T, "High Efficiency Video Coding", Recommendation H.265, Telecommunications Standardization Sector of ITU, Series H: Audiovisual and Multimedia Systems, Infrastructure of Audiovisual Services—Coding of Moving Video, Oct. 2014, 540 pages.

Li et al., "CE4—Ranking Based Spatial Merge Candidate List for Inter Prediction (Test CE4.4.14)", JVET-L0318, Tencent America, Joint Video Experts Team JVET of ITU-T SG 16 WP 3 and ISO/IEC JTC 1/SC 29/WG 11, 12th Meeting: Macao, CN, Oct. 3-12, 2018, pp. 1-4.

Zhang et al., "CE4: Planar Motion Vector Prediction (Test 4.3.1 and 4.3.2)", JVET-L0070_r2, HiSilicone Technologies Co., Ltd., Huawei Technologies Co., Ltd., Joint Video Experts Team JVET of ITU-T SG 16 WP 3 and ISO/IEC JTC 1/SC 29/WG 11, 12th Meeting: Macao, CN, Oct. 3-12, 2018, pp. 1-8.

\* cited by examiner

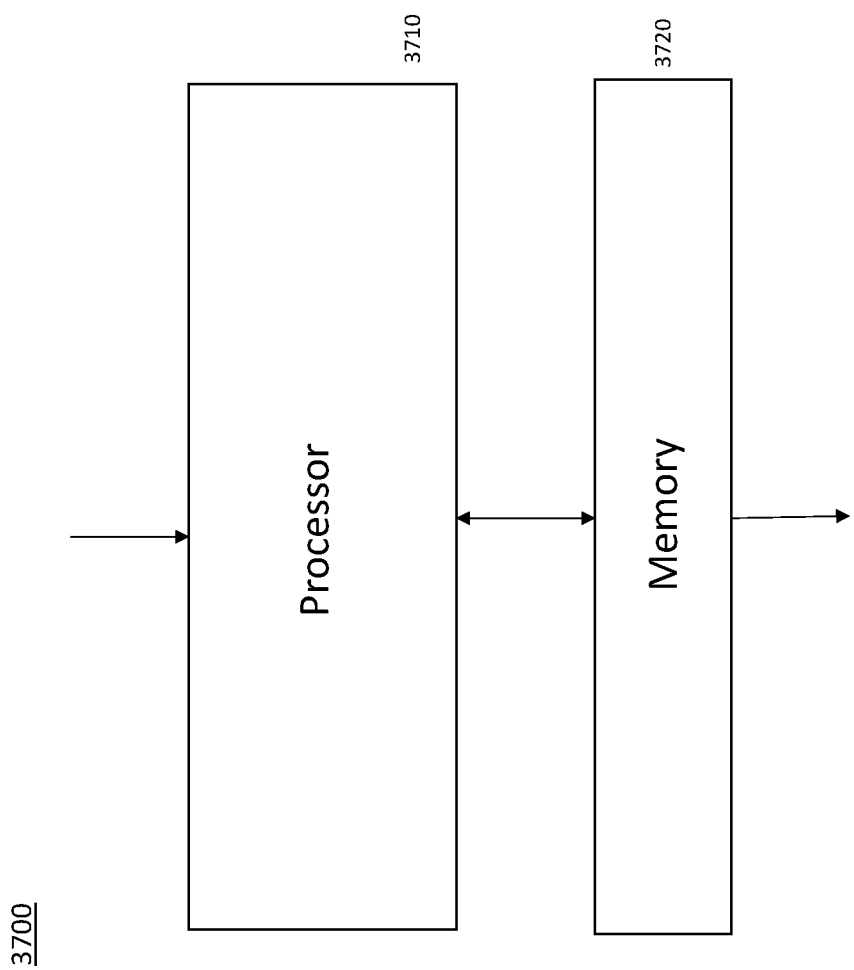

ated OBMC diagonal weighting.
MMVD AND SMVD COMBINATION WITH MOTION AND PREDICTION MODELS

CROSS REFERENCE TO RELATED APPLICATIONS

This application is the National Stage Entry under 35 U.S.C. § 371 of Patent Cooperation Treaty Application No. PCT/US2019/066448, filed Dec. 16, 2019, which claims priority from European Patent Application No. 183067808.1, filed Dec. 17, 2018, the contents of each of which are hereby incorporated by reference herein in their entireties.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for simplifications of coding modes based on neighboring samples dependent parametric models.

According to a first aspect, there is provided a method. The method comprises steps for indicating a first motion mode through syntax in a video bitstream; indicating use of a second motion mode through presence of syntax in the video bitstream, and if present, including information related to said second motion mode; and, encoding a video block using motion information corresponding to said first and second motion modes.

According to a second aspect, there is provided a method. The method comprises steps for parsing a video bitstream for syntax indicative of a first motion mode; parsing the video bitstream for syntax indicating presence of a second motion mode, and if present, determining information related to said second motion mode; obtaining motion information corresponding to said first motion mode; and, decoding the block using said motion information.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 37 shows one embodiment of an apparatus under the general described aspects.

DETAILED DESCRIPTION

The embodiments described here are in the field of video compression and generally relate to video compression and video encoding and decoding. The general aspects described aim to provide a mechanism to operate restrictions in high-level video coding syntax or in the video coding semantics to constrain the possible set of tools combinations.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, motion compensated temporal prediction is employed to exploit the redundancy that exists between successive pictures of a video.

Figure 1:
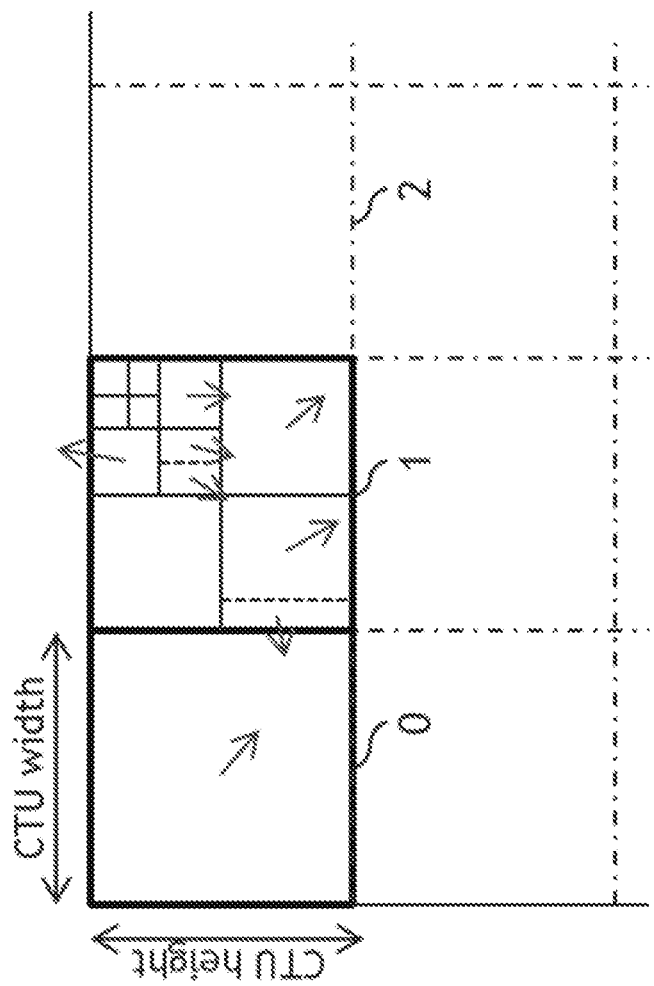
FIG. 1 shows an example of a Coding Tree Unit and Coding Tree concepts to represent a compressed HEVC picture.

To do so, a motion vector is associated to each prediction unit (PU). Each Coding Tree Unit (CTU) is represented by a Coding Tree in the compressed domain. This is a quad-tree division of the CTU, where each leaf is called a Coding Unit (CU), as in FIG. 1.

Figure 2:
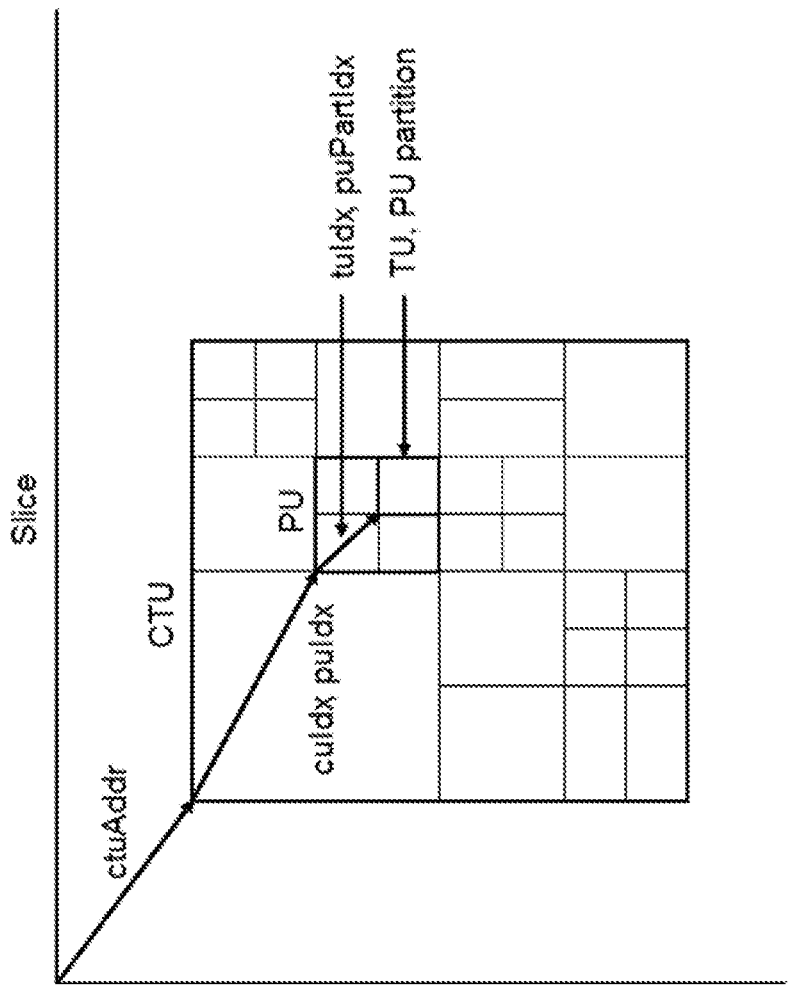
FIG. 2 shows an example of division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, as in FIG. 2.

Exactly one Motion Vector is assigned to each PU in HEVC. This motion vector is used for motion compensated temporal prediction of the considered PU. Therefore, in HEVC, the motion model that links a predicted block and its reference block simply consists in a translation.

Two modes are employed in HEVC to encode the motion data. They are respectively called AMVP (Adaptive Motion Vector Prediction) and Merge.

AMVP basically consists in signaling the reference picture(s) used to predict current PU, the Motion Vector Predictor index (taken among a list of 2 predictors) and a motion vector difference. This document deals with the merge mode, hence AMVP is not addressed in the following.

The merge mode consists in signaling and decoding the index of some motion data collected in a list of motion data predictors. The list is made of 5 candidates and is constructed the same way on the decoder and on the encode sides. Therefore, the merge mode aims at deriving some motion information taken from the merge list. The merge list typically contains the motion information associated to some spatial and temporal surrounding blocks, available in their decoded state when the current PU is being processed.

In the VTM-3 (VVC draft 3), a new type of motion vector coding has been adopted, called MMVD (Merge with Motion Vector Difference). The MMVD mode basically consists in introducing some motion vector difference, added to some classical merge candidate, to generate some motion information of the block to encode or decode.

MMVD increases the coding efficiency of the VVC coding system. However, it has been observed that in the VVC draft 3, the MMVD tool is applied only in the usual translational merge mode. It may be of interest to combine the MMVD tool with some other inter coding modes, in particular some other motion vector (or motion model in the case of a sub-block-based motion field) generation tools contained in the VVC coding system.

Another motion vector coding tool that is being proposed to the VVC standardization is the so-called symmetrical motion vector coding (SMVD). As with MMVD, SMVD is a new mode for improving the efficiency of the Motion Vector coding. It is proposed within the AMVP mode. However, SMVD is only applied to translational AMVP case. As for MMVD, it may be beneficial to extend it to some motion models beyond the simple translational model.

In the JVET (Joint Video Exploration Team) proposal for a new video compression standard, known as Joint Exploration Model (JEM), it has been proposed to accept a quadtree-binary tree (QTBT) block partitioning structure due to high compression performance. A block in a binary tree (BT) can be split in two equal sized sub-blocks by splitting it either horizontally or vertically in the middle. Consequently, a BT block can have a rectangular shape with unequal width and height unlike the blocks in a QT where the blocks have always square shape with equal height and width. In HEVC, the angular intra prediction directions were defined from 45 degree to −135 degree over a 180 angle, and they have been maintained in JEM, which has made the definition of angular directions independent of the target block shape.

To encode these blocks, Intra Prediction is used to provide an estimated version of the block using previously reconstructed neighbor samples. The difference between the source block and the prediction is then encoded. In the above classical codecs, a single line of reference sample is used at the left and at the top of the current block.

In HEVC (High Efficiency Video Coding, H.265), encoding of a frame of video sequence is based on a quadtree (QT) block partitioning structure. A frame is divided into square coding tree units (CTUs) which all undergo quadtree based splitting to multiple coding units (CUs) based on rate-distortion (RD) criteria. Each CU is either intra-predicted, that is, it is spatially predicted from the causal neighbor CUs, or inter-predicted, that is, it is temporally predicted from reference frames already decoded. In I-slices all CUs are intra-predicted, whereas in P and B slices the CUs can be both intra- or inter-predicted. For intra prediction, HEVC defines 35 prediction modes which includes one planar mode (indexed as mode 0), one DC mode (indexed as mode 1) and 33 angular modes (indexed as modes 2-34). The angular modes are associated with prediction directions ranging from 45 degree to −135 degree in the clockwise direction. Since HEVC supports a quadtree (QT) block partitioning structure, all prediction units (PUs) have square shapes. Hence the definition of the prediction angles from 45 degree to −135 degree is justified from the perspective of a PU (Prediction Unit) shape. For a target prediction unit of size N×N pixels, the top reference array and the left reference array are each of size 2N+1 samples, which is required to cover the aforementioned angle range for all target pixels. Considering that the height and width of a PU are of equal length, the equality of lengths of two reference arrays also makes sense.

The invention is in the field of video compression. It aims at improving the bi-prediction in inter coded blocks compared to existing video compression systems. The present invention also proposes to separate luma and chroma coding trees for inter slices.

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU).

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

New emerging video compression tools include a Coding Tree Unit representation in the compressed domain is proposed, in order to represent picture data in a more flexible way in the compressed domain. The advantage of this more flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated.

The splitting of a coding unit is decided on the encoder side through a rate distortion optimization procedure, which consists is determine the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divided in a binary fashion.

One problem solved by this invention is how to extend the use of MMVD and SMVD motion vector coding tools to all the motion model derivation methods and temporal prediction methods that are supported in current proposed video standards, so as to increase the overall compression performance of these proposed standards.

The basic principle of this disclosure is made of two aspects:
  extend the usage of MMVD motion vector coding with all motion models and/or temporal prediction methods supported in the VVC draft 3, as well as other motion models being proposed to the VVC standardization process. In particular, in this disclosure, it is described how to combine MMVD with the affine motion model, the ATMVP motion model, the planar motion model, the regressive motion field, the triangle-partition-based motion model, the GBI temporal prediction method, the LIC temporal prediction method and the Multi-hypothesis prediction method. An enriched use of MMVD in the case of bi-prediction is also provided.
  extend the usage SMVD motion vector coding tool with all motion models and/or temporal prediction methods supported in the VVC draft 3, as well as other motion model generators being proposed to the VVC standardization process. In particular, in this disclosure, it is described how to combine SMVD with the affine motion model, the ATMVP motion model, the planar motion model, the regressive motion field, the triangle-partition-based motion model, the GBI temporal prediction method, the LIC temporal prediction method and the Multi-hypothesis prediction method.

In the VVC video standard being developed, multiple inter prediction modes are supported or are being proposed.

Figure 5:
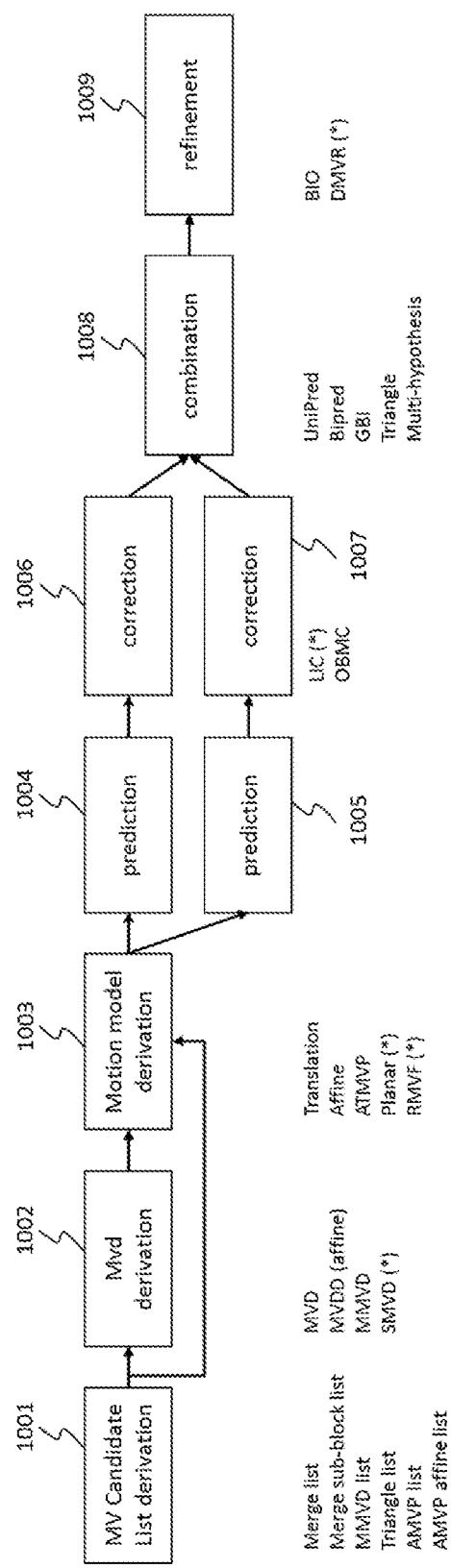
FIG. 5 shows a simplified block diagram of the decoding process in a current scheme.
Figure 6:
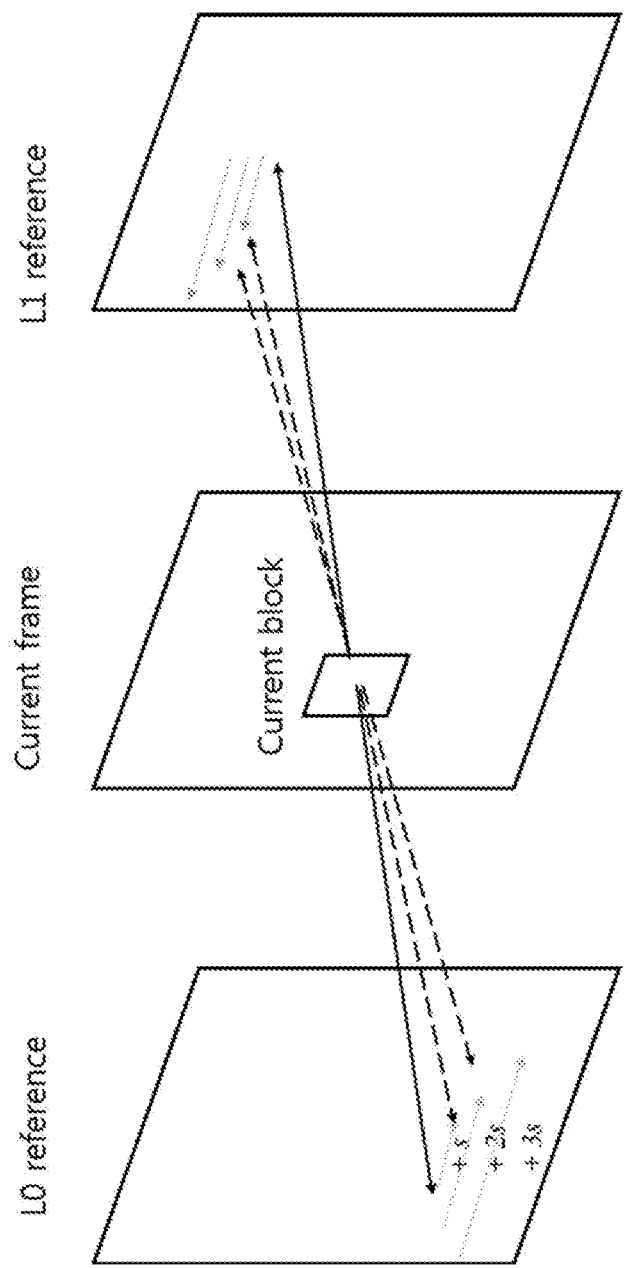
FIG. 6 shows an MMVD illustration in case of bi-prediction mode.
Figure 7:
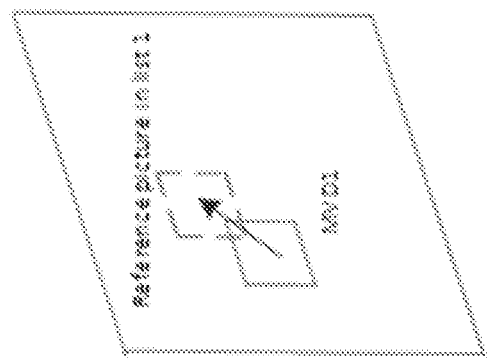
FIG. 7 shows an example of SMVD (symmetrical motion vector difference).
Figure 7:
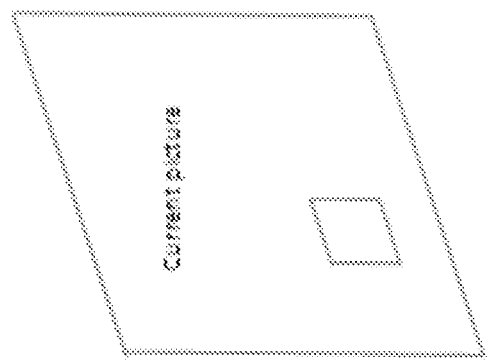
Figure 7:
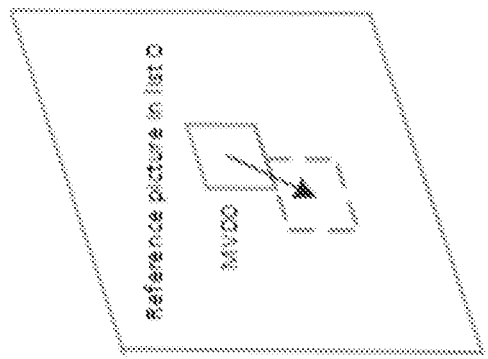

FIG. 5 depicts a simplified block diagram of the inter decoding process in the version 3 of VVC draft. The process starts with derivation of MV predictors (mvp), based on the construction of MV candidate list (1001), that may differ according to the inter mode used for coding the CU or PU.

Step 1002 is the motion vector difference (MVd) decoding step. The decoded MVd is to be used to reconstruct the motion vector(s) of the considered CU/PU, through its addition to the motion vector predictor obtained at the previous step (1001).

Next step 1003 consists in deriving the motion model from the motion vector values issued from the two previous steps. The model may be simply translational or more sophisticated, as will be described later.

The prediction of the samples in the CU using the decoded MVs is performed in steps 1004 for one reference picture, and in case of bi-prediction mode, in step 1005 for the other reference picture. The prediction signal is further refined in steps 1006 for one reference picture, and in case of bi-prediction mode, in step 1007 for the other reference picture. When applicable, combination of bi-predictions, or mixed intra/inter predictions, or of PUs inside the CU is achieved in step 1008. A final refinement step of the prediction signal is performed in step 1009.

FIG. 5 also indicates the different modes applying for these different steps in VTM3. Tools indicated with (*) correspond to tools being proposed for adoption, but not adopted at VVC draft 3 stage.

In inter, two basic modes for deriving the MVs are used, Merge and AMVP. In both cases, a MV candidate list is derived. This derivation process generally differs for these two modes, and even for a given mode, variants are applied depending on other settings applying to the CU (e.g. Merge or AMVP, Translational or Affine model).

In Merge mode, a predictor index is signaled to fetch the MV in the merge candidate list. In addition, in case skip mode does not apply, a samples prediction residual is signaled. In AMVP mode, for each reference picture (1 reference picture in case of uni-prediction, 2 in case of bi-prediction), a reference frame index, a predictor index and a motion vector difference (mvd) are signaled. In addition, a samples prediction residual is signaled.

Table 1 provides an overview of the content of the different candidate lists in the current VTM.

TABLE 1

Overview of the candidates in the different MV candidates lists

| List | Candidate types |
|---|---|
| Merge | Spatial |
|  | TMVP (temporal motion vector predictor) |
|  | HMVP (history-based mvp) |
|  | Pairwise |
|  | Zero |
| Merge sub-block | ATMVP |
|  | Spatial (inherited model) |
|  | Virtual cands (from several spatial & 1 temporal MVs) |
|  | Zero |
| AMVP | Spatial cands |
|  | TMVP |
|  | HMVP |
|  | Zero |
| AMVP Affine | Spatial inherited |
|  | Virtual 4 or 6-para |
|  | Trans v2 then v1 then v0 |
|  | TMVP |
|  | Zero |
| MMVD | Like merge, only 2 cands |
| Triangle | Spatial (5 × 4) |
|  | 2 TMVP |

A summary of the inter modes considered in the invention is provided in the table below, with some indicative number on the performance (in terms of bitrate variation, in percentage, in random access configuration, for psnrY).

| Tool | Description | perf |
|---|---|---|
| affine | Affine motion model | −3.8 |
| atmvp | Alternative temporal motion vector prediction | −0.7 |
| bio | Bi-directional optical flow | −1.3 |
| cpr | MV referencing to current picture | Specific screen content |
| gbi | Generalized bi-pred | −0.7 |
| lic | Local illumination compensation | −0.5 |
| mh | Multi-hypothesis Combined merge/intra | −0.5 |
| mmvd | Merge with MVD aka Ultimate MV expression | −1.3 |

-continued

| Tool | Description | perf |
|---|---|---|
| planar | Mv field per subblock based on planar model | −0.6 |
| rmvf | Mv field per subblock based on regressive model | −0.7 |
| smvd | Symmetrical mvd, only 1 mvd coded in bipred | −0.6 |
| triangle | Triangular partitions | −0.6 |

The sub-sections below provide more details on the considered inter modes, with syntax elements that are associated to these modes or tools.

The general aspects described herein focus on the "Mvd derivation" and "Model derivation" steps of FIG. 5. The goal of this disclosure is to extend the usage of MMVD and SMVD motion vector coding tools, to motion models beyond the simple translational motion model.

MMVD Motion Vector Difference Coding Tool Description

MMVD only applies in Merge mode. It uses the merge candidate list. A flag "mmvd_skip" indicates if MMVD mode applies or not. When the mode applies, a MV difference (mmvd) is built as:

A syntax element (noted here as mmvd_idx) is signalled to build the corrective MV mmvd, consisting of the following information:

The base MV index, chosen by the encoder among the two first translational merge candidates.

An index noted mmvd_dir_idx related to a direction D in the (x,y) coordinate system (currently 4) (a table dir[ ] of 4 elements {(0,1), (1,0), (−1,0), (0,−1)} is specified)

An index noted mmvd_dist_idx related to a distance step S from the base MV (currently up to 8 distances are possible, with the specification of a table dist[ ] of 8 elements {¼-pel, ½-pel, 1-pel, 2-pel, 4-pel, 8-pel, 16-pel, 32-pel})

When MMVD mode is applied, the MV difference is then computed as refinementMV=dir[mmvd_dir_idx]*dist[mmvd_dist_idx]

One single MV difference is signaled, even if the CU is coded in bi-prediction. In the bi-prediction case, two symmetrical MV differences are obtained from the single coded MV. When the temporal distances between the predicted picture and the reference picture differ between reference picture lists L0 and L1, then the decoded mmvd is assigned to the MV difference (mvd) associated to the largest temporal distance. The mvd associated to the smallest distance is being scaled as a function of the POC distances.

For instance, let's consider the case where the reference picture k (k=0 or 1) is the closest one to the current picture. Let's define kk=1−k, POCref_0, POCref_1 and POCcur the picture order count of the reference picture 0, reference picture 1 and current picture, respectively. A scaling factor is derived as follows:

sc=(POCref_kk−POCcur)/(POCref_k−POCcur)

Then the refinement MVs for each of the reference pictures are derived as follows:

refinementMV_k=refinementMV refinementMV_kk=sc*refinementMV

In the VVC draft 3, MMVD only applies to the translational motion model.

Symmetrical MVD Proposed in JVET-L0370

The symmetrical MVD (SMVD) tool is being considered for VVC. Its principle is to encode some motion vector information, under the constraint that the motion information of a CU is made of two symmetrical forward and backward motion vector differences, in case of bi-prediction. SMVD mode applies to AMVP only in the VVC draft 3.

The coding of CU under this constraint, called the SMVD mode, is signaled through a CU-level flag symmetrical_mvd_flag.

This flag is coded if the SMVD mode is feasible for, i.e. if the prediction mode of the CU is bi-prediction and two reference pictures for the CU are found as follows:

The reference pictures for the current CU are searched, as the closest forward and backward reference pictures, respectively in the (L0 and L1) or (L1 and L0) reference picture lists. If not found the SMVD mode is not applicable and the symmetrical_mvd_flag is omitted.

If the symmetrical_mvd_flag is signaled and is equal to true, then:

One mvd is signaled for the L0 reference picture, and the mvd for the other reference picture list is derived as symmetrical, i.e. the opposite of the first one.

2 MV predictors indices are signaled (one per reference picture list), as in the classical AMVP mode.

Motion Models Supported in VVC Draft 3 or Proposed to VVC

Translational Model (VVC Draft 3)

By default, motion in a CU is based on a translational MV applying to all samples in the block.

ATMVP (WC Draft 3)

Figure 8:
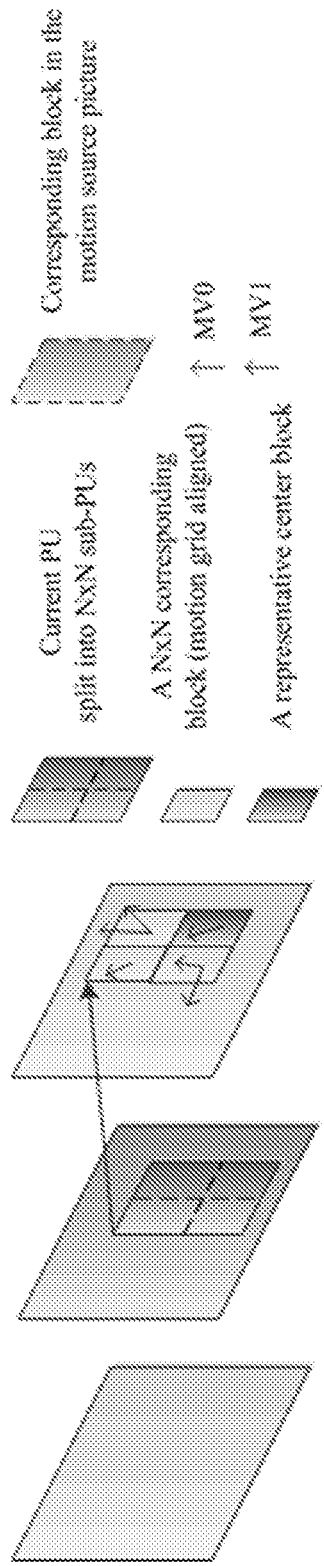
FIG. 8 shows an example of ATMVP motion prediction for a Coding Unit.

In the alternative (advanced) temporal motion vector prediction (ATMVP) method, shown by FIG. 8, one or several temporal motion vector predictors for a current CU are retrieved from the reference picture(s) for the current CU.

First, a so-called temporal motion vector and associated reference picture index are obtained as the motion data associated to the first candidate in the usual merge candidate list of current CU.

Next, the current CU is divided into N×N sub-CUs, N being typically equal to 4. This is shown in FIG. 8. For each N×N sub-block (sub-CU), the motion vector(s) and reference picture indice(s) are identified with the help of the temporal motion vector, in the reference picture associated to the temporal MV. The N×N sub-block in the reference pictures that is pointed to by the temporal MV from the current sub-CU position is considered. Its motion data is taken as the ATMVP motion data prediction for current sub-CU. It is then converted to the motion vectors and reference picture indices of the current sub-CU, through appropriate motion vector scaling.

Note that in the VVC draft 3, the ATMVP motion information predictor is part of the sub-block-based merge candidate list.

Affine Motion Model (VVC Draft 3)

One of the new motion models introduced in VVC is the affine mode, which basically consists in using an affine motion field to represent the motion vectors in a CU.

Figure 9:
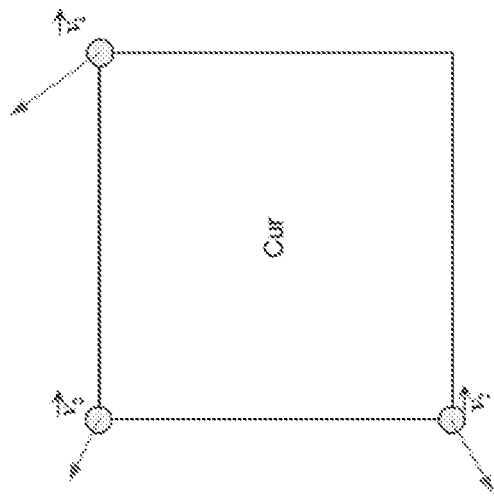
FIG. 9 shows an example of simple affine models used in the Joint Exploration Model and VTM.
Figure 9:
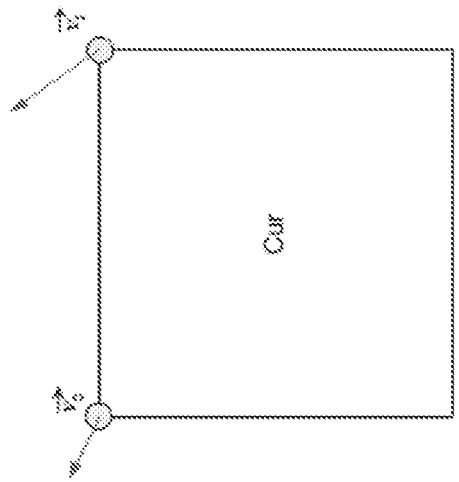

The motion model used are illustrated by FIG. 9 for 2 or 3 control point motion vectors (also called control points in the following). The 4-parameter affine motion field, based on 2 control points, consists in the following motion vector component values for each position (x, y) inside the considered block:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases}$$

Equation 1: Affine Model Used to Generate the Motion Field Inside a CU to Predict Where $(v_{0x}, v_{0y})$ and $(v_{1x}, v_{1y})$ are the so-called control point motion vectors (CPMVs) used to generate the affine motion field. $(v_{0x}, v_{0y})$ is the top-left corner control point motion vector. $(v_{1x}, v_{1y})$ is the top-right corner control point motion vector. A 6-parameter affine field, generated from 3 CPMVs, is also possible as described in JVET-J0021.

Figure 10:
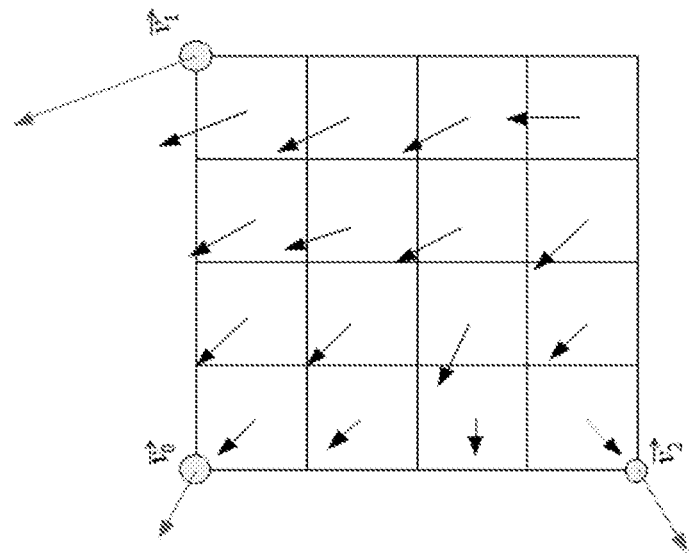
FIG. 10 shows an example of a 4×4 sub-CU based affine motion vector field.
Figure 10:
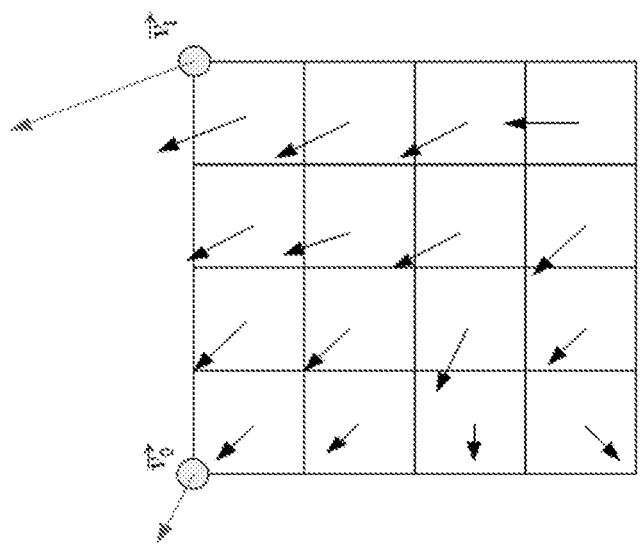

In practice, to keep complexity reasonable, the affine motion is managed on a 4×4 sub-block basis, i.e. the same motion vector is used for each sample in each 4×4 sub-block (sub-CU) of the considered CU (see FIG. 10). An affine motion vector is computed from the CPMVs, at the position of the center of each sub-block. The obtained MV is represented at 1/16-pel accuracy.

As a result, entire block (CU) is temporally predicted through motion compensation of each 4×4 sub-block (sub-CU) with its own MV. Affine motion compensation can be used in 2 ways in the VTM: affine inter (AF_INTER), and affine merge (or merge affine), described below.

Affine Inter (AF INTER).

Figure 11:
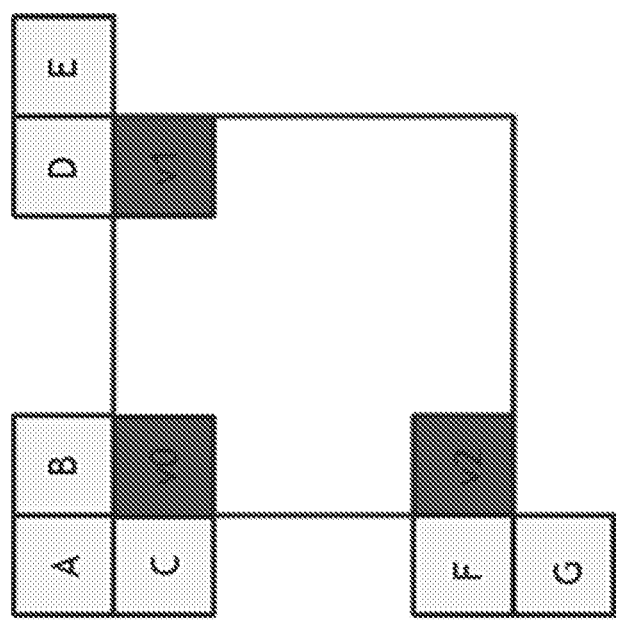
FIG. 11 shows an example of a motion vector prediction process for Affine Inter coded Coding Unit.

A CU in AMVP mode, which size is larger than 8×8, can be predicted in affine inter mode. This is signaled through a flag inter_affine_flag coded at the CU level. The generation of the affine motion field for that inter CU includes determining control point motion vectors (CPMV), which are obtained by the decoder through the addition of a motion vector difference plus a control point motion vector prediction (CPMVP). The CPMVP is a pair (for a 4-parameters affine model with 2 CPMVs) or a triplet (for a 6-parameters affine model with 3 CPMVs) of motion vector candidates, which can be inherited from affine neighbors (as in the Affine Merge mode) or constructed from non-affine motion vectors respectively taken from the list (A, B, C) and (D, E) and/or (F, G) illustrated on FIG. 11. This corresponds to "virtual candidates" mentioned in Table 1.

Affine Merge.

Figure 12:
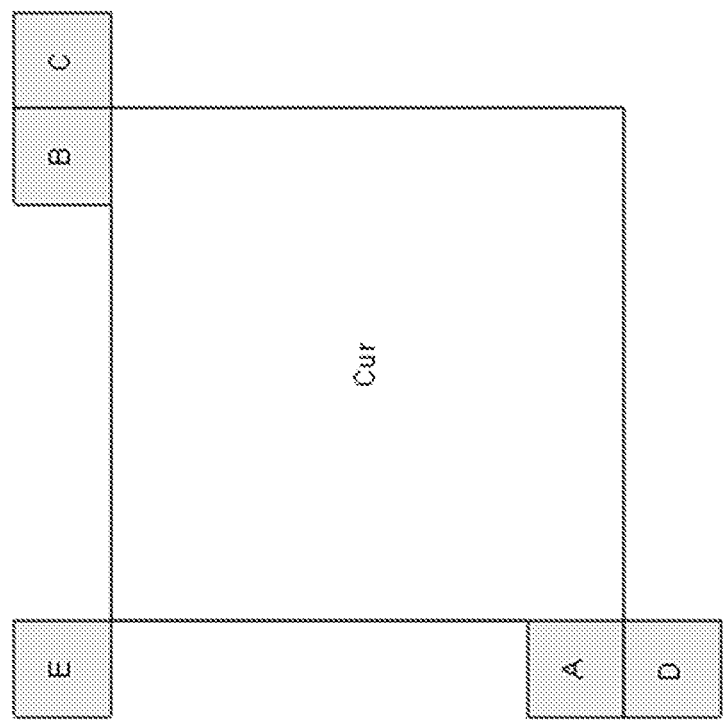
FIG. 12 shows motion vector prediction candidates in the Affine Merge mode.

In affine merge mode, a CU-level flag indicates if a CU in merge mode employs affine motion compensation. If so, then, in the JEM (the exploratory reference software developed by JVET before VVC), the first available neighboring CU that has been coded in affine mode is selected among the ordered list of candidate positions (A, B, C, D, E) of FIG. 12.

Figure 13:
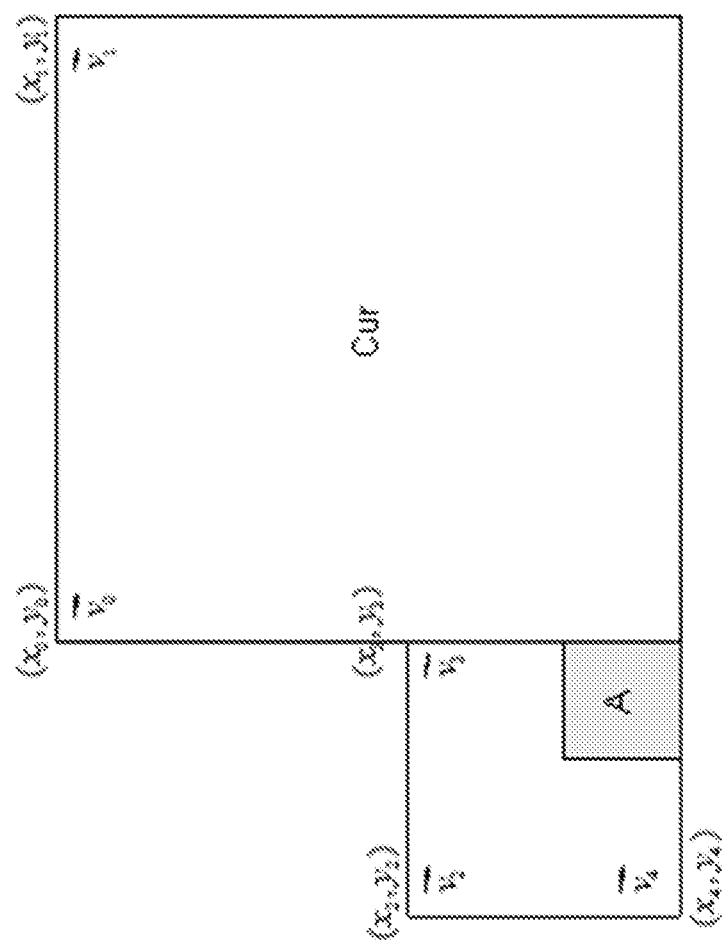
FIG. 13 shows spatial derivation of affine motion field control points in the case of Affine Merge.

Once the first neighboring CU in affine mode is obtained, then the 3 motion vectors $\vec{v_2}$, $\vec{v_3}$, and $\vec{v_4}$ from the top-left, top-right and bottom-left corners of the neighboring CU are retrieved (see FIG. 13). Based on these three vectors, the two or three CPMVs of the top-left, top-right and/or bottom-left corners of current CU are derived as follows:

$$\circ \vec{v_0} = \vec{v_2} + (\vec{v_4} - \vec{v_2})\left(\frac{Y_{curr} - Y_{,Vneighb}}{H_{neighb}}\right) + (\vec{v_3} - \vec{v_2})\left(\frac{X_{curr} - X_{neighb}}{W_{neighb}}\right)$$

$$\circ \vec{v_1} = \vec{v_0} + (\vec{v_3} - \vec{v_2})\left(\frac{W_{curr}}{W_{neighb}}\right)$$

-continued $$\circ \ \vec{v_2} = \vec{v_0} + (\vec{v_4} - \vec{v_2})\left(\frac{H_{curr}}{H_{neighb}}\right)$$

Equation 2: Derivation of Current CU's CPMV Based on the Three Corner Motion Vectors of the Neighboring CU When the control point motion vectors $\vec{v_0}$, $\vec{v_1}$ and/or $\vec{v_2}$ of current CU are obtained, the motion field inside current CU is computed on a 4×4 sub-CU basis, through the model of Equation 1.

In a concurrent application, more candidates for affine merge mode are considered. At the encoder, the best candidate is then selected through a Rate-Distortion Optimization process and the index of this best candidate is coded in the bitstream through the merge_idx syntax element.

The next affine candidates that are put in the affine merge candidate list are the "constructed" (or "virtual") affine model candidates, as opposed to inherited candidates. Constructed candidates are affine motion fields that are computed based on available neighboring motion vectors around current CUs, including from neighboring CUs not coded in affine mode. 2 or 3 neighboring MVs are derived and are used to generate a candidate affine motion field for current CU.

The neighboring MVs used to construct affine merge candidates include several spatial and one temporal MVPs.

Planar Motion Model (Proposed in JVET-L0070)

Figure 14:
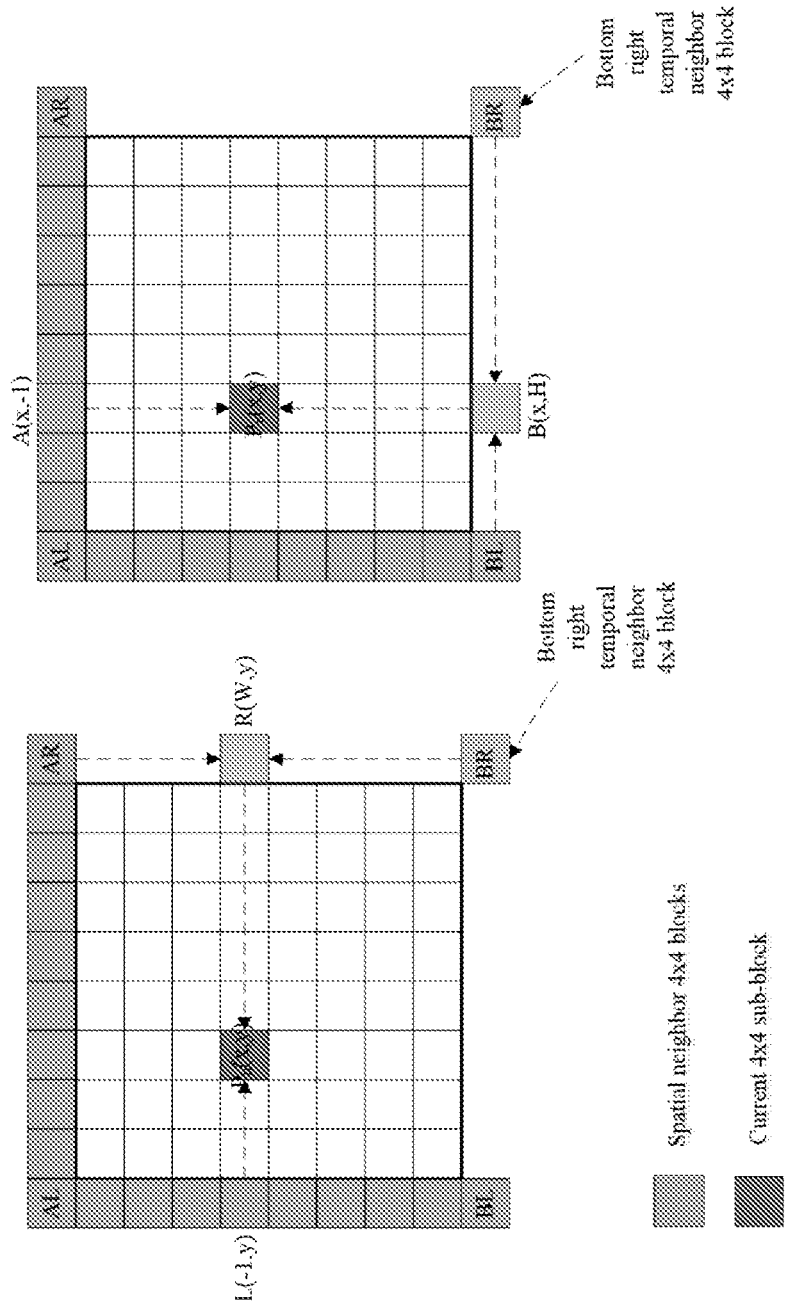
FIG. 14 shows an example planar motion vector prediction process.

Planar motion vector prediction (PMVP) is being proposed as an additional merge mode to the VVC codec design in JVET-L0070. Planar motion vector prediction, shown on FIG. 14, is achieved by averaging a horizontal and a vertical linear interpolation on 4×4 block basis as follows. These linear interpolations are performed from generator MVs, located on the corners of the CU (AR, AL, BL). Its principle is illustrated on FIG. 14.

$$P(x,y)=(H \times P_h(x,y)+W \times P_v(x,y)+H \times W)/(2 \times H \times W)$$

Regression MVF (RMVF) Model

Regression based motion vector prediction is being proposed as an additional merge mode to the VVC codec design in JVET-L0171.

Figure 15:
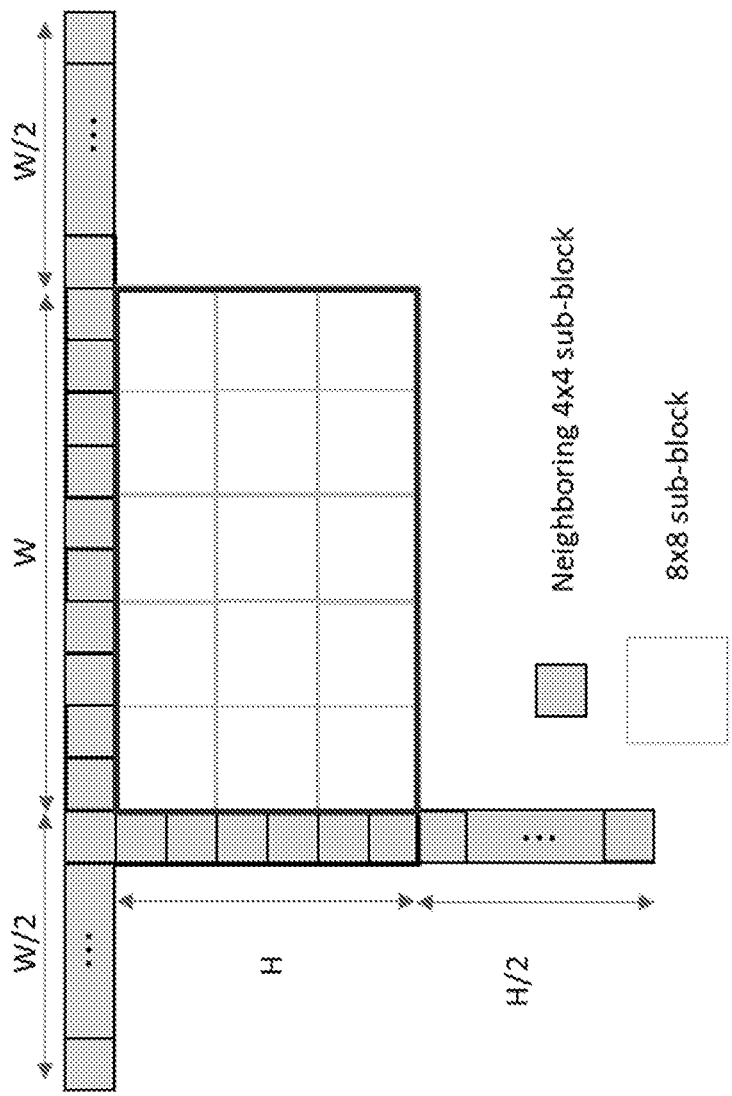
FIG. 15 shows a regression-based motion vector field construction.

The Regression based Motion Vector Field (RMVF), shown in FIG. 15, consists in the following. The principle of RMVF is to use a 6-parameter motion model for calculating the motion vectors of sub-blocks.

$$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix}$$

Motion parameters are calculated based on one line and one row of spatially neighboring 4×4 sub-blocks using their motion vectors and center locations as an input to a linear regression method.

Triangle-Partition-Based Motion Model

Figure 16:
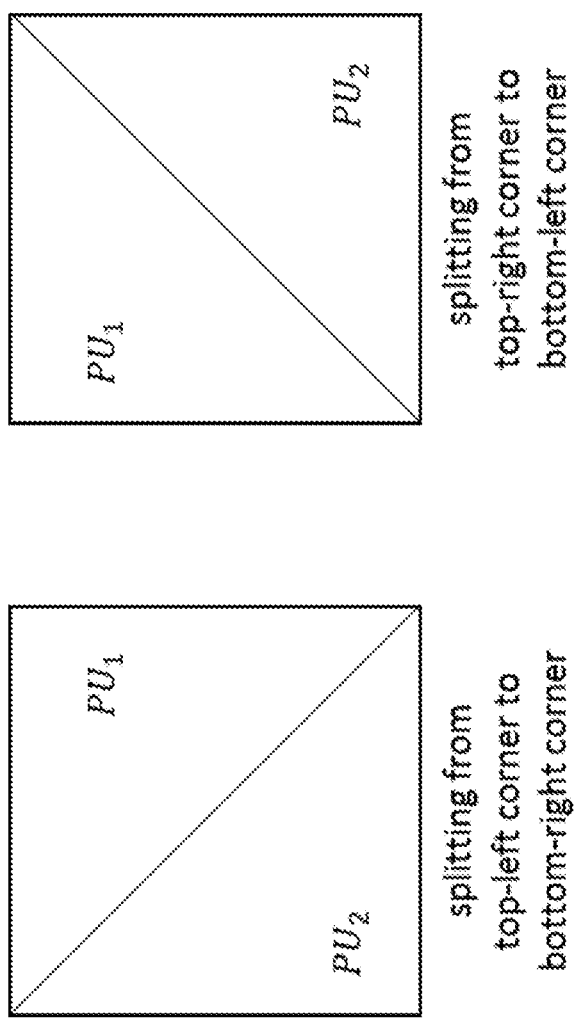
FIG. 16 shows an example of splitting a coding unit into two triangular prediction units (PUs).

The triangle motion partitioning tool is adopted in VVC draft 3. It allows flexibility in the partitioning of a block into 2 prediction units as shown by FIG. 16. Basically, a CU is divided into 2 triangular prediction units, in diagonal or inverse diagonal direction. Each triangular PU is inter-predicted using its own uni-prediction motion vector and reference picture, which are derived from a dedicated uni-prediction candidate list.

Figure 17:
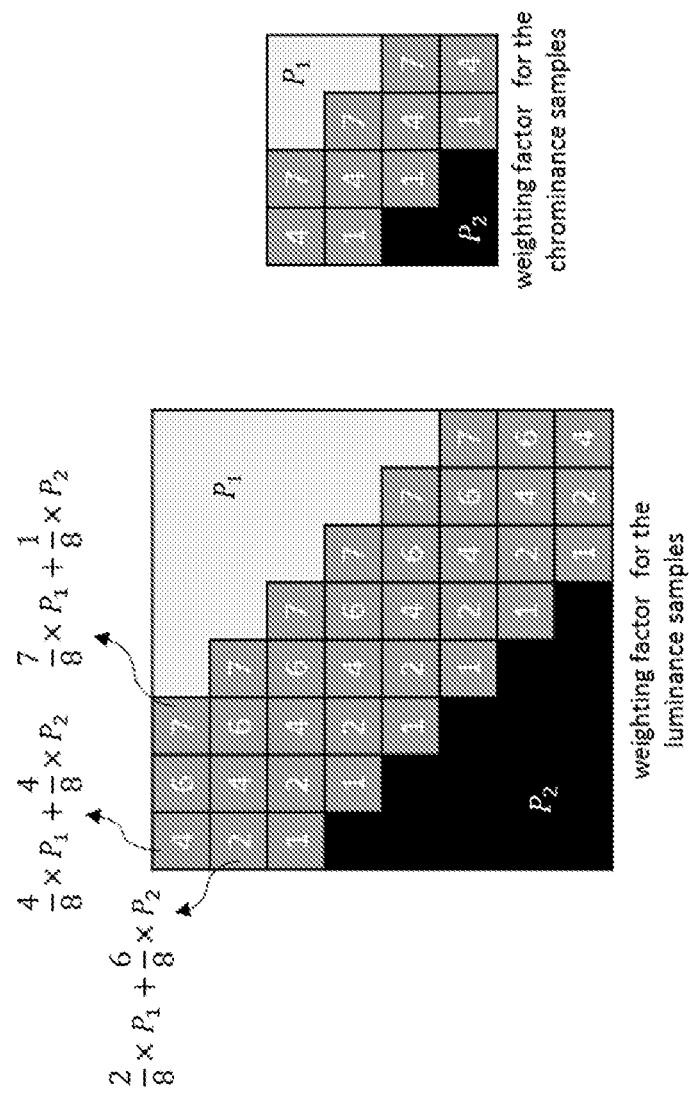
FIG. 17 shows non-rectangular partitioning and associated OBMC diagonal weighting.

An adaptive weighting process (see FIG. 17) is performed to the diagonal edge after predicting the triangular prediction units. Then, the transform and quantization process are applied to the whole CU. The triangular PU mode is only applied to skip and merge modes.

Local Illumination Compensation (LIC)

Figure 18:
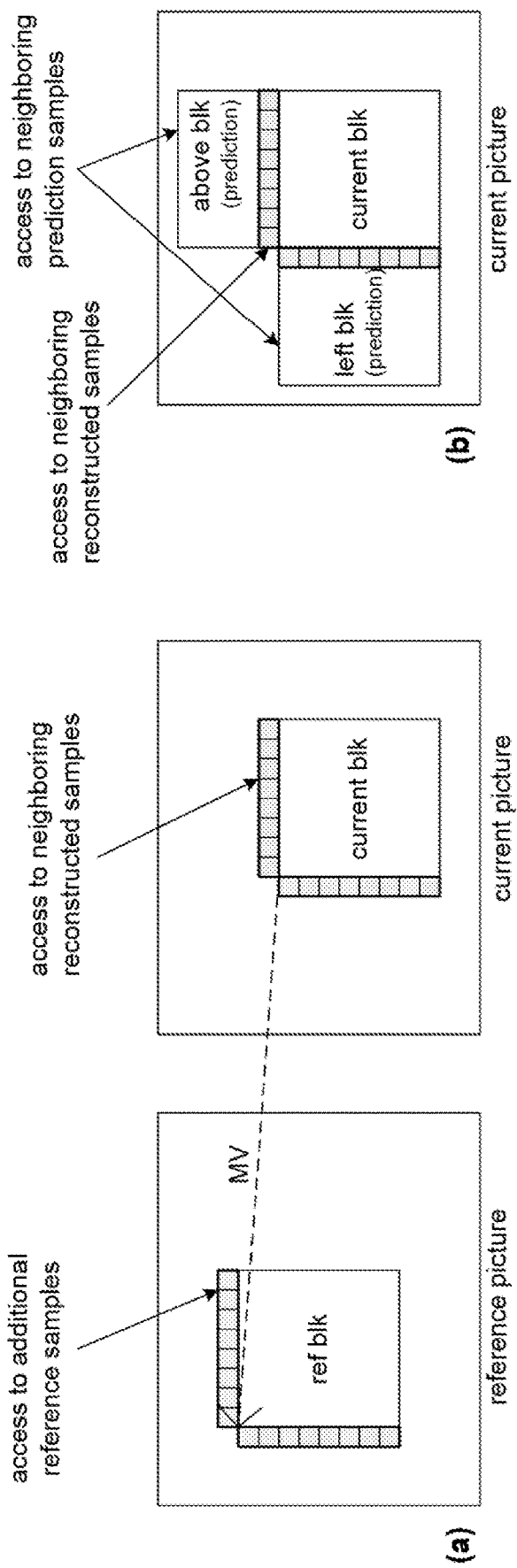
FIG. 18 shows an example of how LIC parameters are derived from (a) neighboring reconstructed samples and (b) the corresponding collocated reference samples.

The purpose of LIC is to compensate for illumination change which may occur between a predicted block and its reference block employed through motion compensated (MC) temporal prediction. In this tool, the decoder computes some prediction parameters based on some reconstructed picture samples, localized on the left column and/or on the top line of the current block and reference picture samples localized on the left column and/or on the top line of the motion compensated block (FIG. 18a).

In another approach the prediction samples of the neighboring left/top reconstructed blocks (FIG. 18b) may be used.

In case of bi-prediction, a variant of LIC ("bi-dir-IC") consists in estimating illumination change in-between the two reference blocks of current to derive the IC parameters for the current block.

Figure 19:
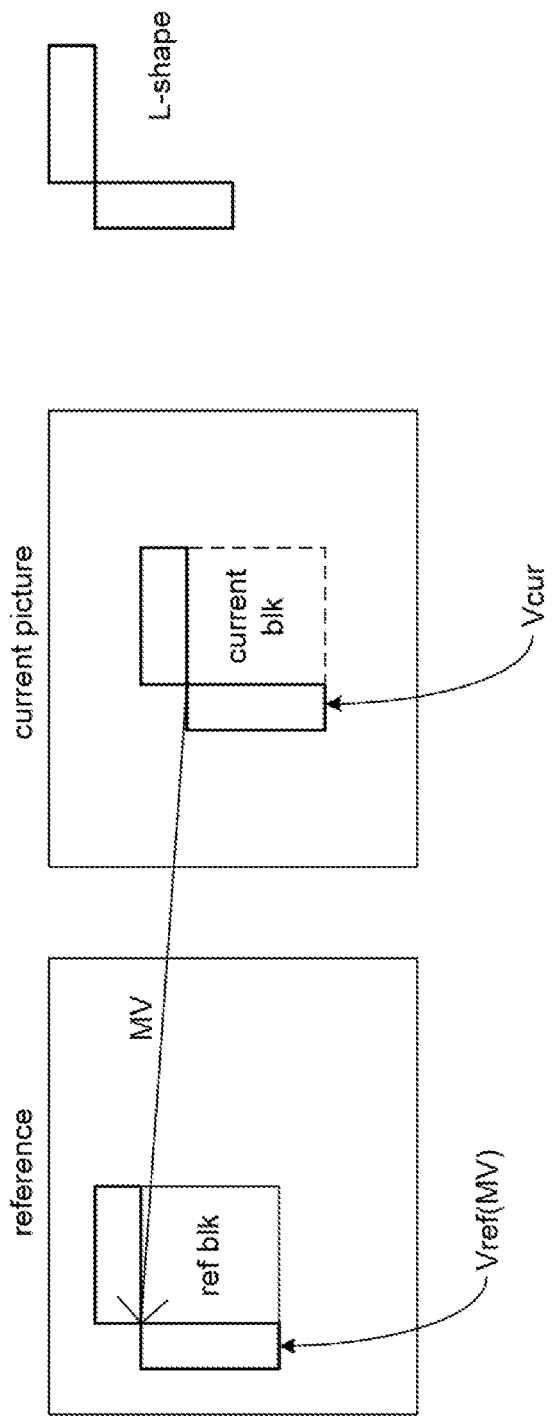
FIG. 19 shows an example of neighboring samples being used for deriving IC parameters.

LIC parameters are chosen so as to minimize the mean square error difference (MSE) between the samples in Vcur and the corrected samples in Vref(MV). Typically, the LIC model is linear: LIC(x)=a.x+b.

$$(a_i, b_i) = \underset{(a,b)}{\operatorname{argmin}} \left( \sum_{r \in Vcur, s \in Vref(MV)} (\text{rec\_cur}(r) - a.\text{rec\_ref}(s) - b)^2 \right)$$

s and r correspond to pixel locations, respectively in Vcur and in Vref(MV), shown in FIG. 19.

As a consequence, when LIC is used for temporal prediction, the linear LIC model is applied onto motion compensated block, to provide the temporal prediction of current block.

Generalized Bi-Prediction (GBI)

GBI is adopted in VVC draft 3. It applies unequal weights to predictors from L0 and L1 in bi-prediction mode. In inter prediction mode, multiple weight pairs including the equal weight pair (½, ½) are evaluated based on rate-distortion optimization (RDO), and the GBI index of the selected weight pair is signaled to the decoder.

In AMVP mode, GBI index, which carries the GBI weights information, is signaled at the CU level.

In merge mode, the GBI index is inherited from a neighboring CU. A block predicted in GBI mode is computed as follows:

$$P_{GBi}=(w_0 * P_{L0}+w_1 * P_{L1})$$

where $w_0$ and $w_1$ are the selected GBI weights. The supported $w_1$ values are typically {−¼, ⅜, ½, ⅝, 5/4}. The sum of $w_1$ and $w_0$ being equal to 1, the corresponding $w_0$ values are {5/4, ⅝, ½, ⅜, −¼}. The weight pair is chosen and signaled at CU-level.

For non-low delay pictures, the number of weights is reduced. The $w_1$ and $w_0$ values are respectively {⅜, ½, ⅝} and {⅝, ½, ⅜}.

1.1.1. Non-Sub-Block Spatial Temporal Merge Motion Vector Predictor (STMVP)

This section describes the prior-art method JVET-L0354 to generate a spatial temporal merge candidate called STMVP. The method basically consists in retrieving two top and left spatial neighboring motion vectors of current PU, and the temporal motion vector predictor of current CU.

Figure 20:
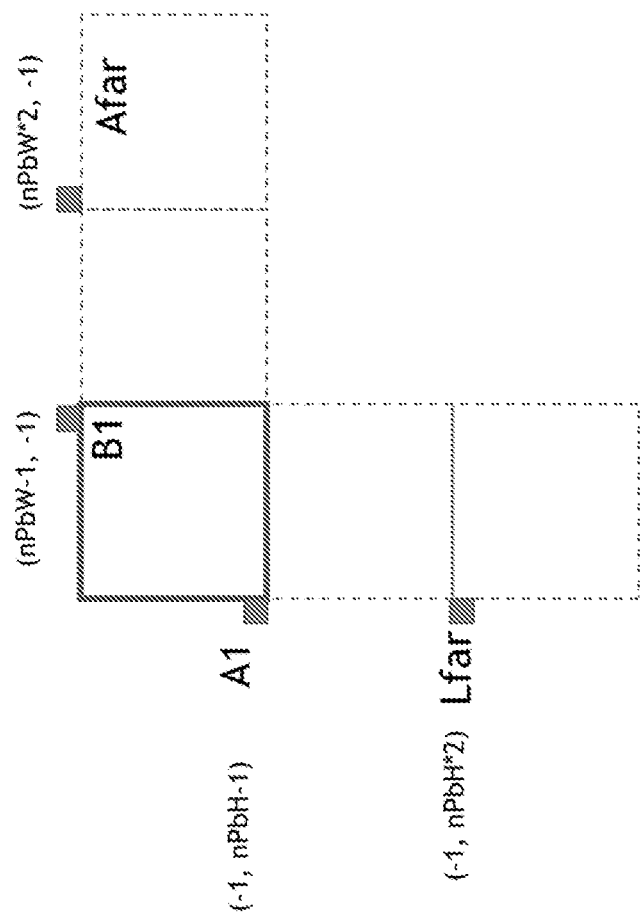
FIG. 20 shows the spatial position considered in computation of non-sub-block STMVP merge candidates.

The spatial neighbors are taken at a spatial position called Afar, illustrated in FIG. 20. The spatial position of Afar relative to the top-left position of current PU is given by coordinates (nbPW*2, −1). Here nbPW is the width of current block. If no motion vector is available at position Afar (not present or intra coded), then the position B1 is considered as the top-neighboring motion vector of current block.

The choice of the left neighboring block is similar. If available, the neighboring motion vector at relative spatial position (−1, 2*nbPH), noted Lfar, is chosen. nbPH is the height of the current block. If not available then the left neighboring motion vector at position A1 (−1, nbPH-1), is chosen, if it is available.

Next, the TMVP predictor in current block is derived as in the temporal motion vector prediction of HEVC.

Finally, the STMVP merge candidate of current block is computed as the average of the up-to-3 obtained spatial and temporal neighboring motion vector. Therefore, the STMVP candidate here is made of at most one motion vector per reference picture list, as opposed to the sub-block-based approach of STMVP in the JEM. Some variants to the approach of JVET-L0354 are proposed, for example in JVET-L0207.

Proposed Embodiments for Extending the Use of MMVD
Combination of MMVD and Bi-Prediction In the current MMVD design, one single set of mmvd data, made of a direction index and of a distance index, is signaled, even in case of bi-prediction.

Embodiment 1—Inter-Dependent Signaling of mmvd Data for Both Reference Pictures In an embodiment, when the CU is coded in bi-prediction (bipred) mode and that the MMVD mode is enabled for the CU, two sets of mmvd data are signaled, one set for each one of the 2 mmvds applying to each one of the reference pictures (from lists L0 and L1). In addition, the second set of mmvd data can be derived from the first one, with various possible options.

Figure 21:
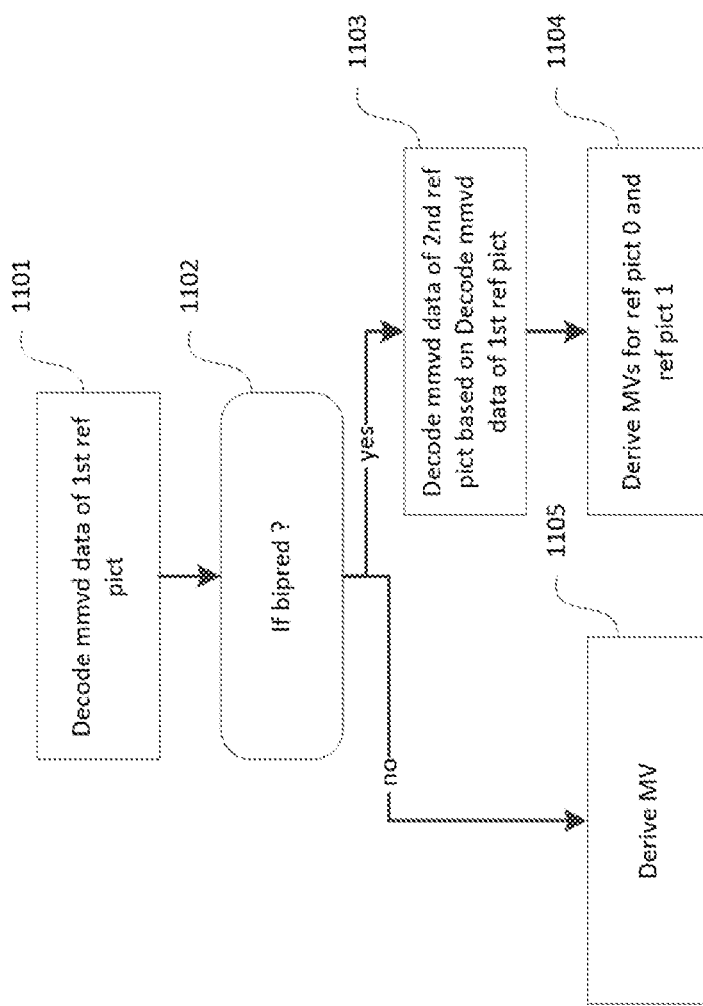
FIG. 21 shows a simplified block diagram of motion vector decoding process when MMVD and bi-prediction are combined.

This is illustrated in the simplified block diagram of FIG. 21. In step 1101, the mmvd data are decoded for a first reference picture. If bi-prediction applies (check of step 1102), the mmvd data are decoded for a second reference picture, conditionally to the mmvd data of the first reference picture (step 1103). The bi-prediction MVs are then derived from the mmvd data of the first and second reference pictures in step 1104. If bi-prediction does not apply (check of step 1102), the uni-prediction MV is derived from the mmvd data of the first reference picture in step 1105.

Embodiment 1—Option 1—Inferred Direction for mmvd of a 2$^{nd}$ Reference Picture In one option, only the distance index is coded for both mmvds (mmvd0_dist_idx and mmvd1_dist_idx). The direction of the second mmvd is deduced from the direction of the first mmvd (mmvd0_dir_idx). If both reference pictures are located at the same temporal side related to the current picture, mmvd1_dir_idx is set equal to mmvd0_dir_idx. If reference pictures are located at both temporal sides from the current picture, mmvd1_dir_idx is set equal to −mmvd0_dir_idx.

An example of related simplified syntax is depicted below.

```
mmvd_flag                         ae(v)
if( mmvd_flag = = 1 ) {
    mmvd0_dist_idx
    mmvd0_dir_idx
    if( bipred_flag = = 1 ) {
        mmvd1_dist_idx
    }
}
```

Embodiment 1—Option 2—Differential Coding of Distance of mmvd of a 2$^{nd}$ Reference Picture In another option, the distance for the second reference picture is coded as a difference to the distance for the first reference picture. An index mmvdd1_dist_idx corresponding to a difference to mmvd0_dist_idx is coded.

An example of related simplified syntax is depicted below.

```
mmvd_flag                         ae(v)
if( mmvd_flag = = 1 ) {
    mmvd0_dist_idx
    mmvd0_dir_idx
    if( bipred_flag = = 1 ) {
        mmvdd1_dist_idx
        mmvd1_dir_idx
    }
}
```

The distance for the refinement MV0 is computed as:

distMV0=dist[mmvd0_dist_idx]

and the distance for the refinement MV1 is computed as:

distMV1=distMV0+dist[mmvdd1_dist_idx]

Embodiment 1—Option 3—Limitation of the Possible Distance Values of the mmvd of a 2$^{nd}$ Reference Picture In an embodiment, the max value of the second distance (being either a distance signaled by mmvd1_dist_idx, or a distance difference as in option 2, being signaled by mmvdd1_dist_idx) is reduced compared to the one of mmvd0_dist_idx. Let's consider that for mmvd0_dist_idx, N possible distances are used (e.g. 8, dist[ ]={¼-pel, ½-pel, 1-pel, 2-pel, 4-pel, 8-pel, 16-pel, 32-pel}). For mmvdd1_dist_idx, only N' first values of dist[ ] can be used, with N'<N.

Following variants are considered:
- N' is computed from N (e.g. N'=N/2)
- N' is computed from the value of mmvd0_dist_idx (e.g. N'=mmvd0_dist_idx, or N'=mmvd0_dist_idx/2)
- N' depends on the value of the scale parameter "sc" (as described in section on MMVD coding tool description). For instance, N'=sc*N MMVD—CPR Combination In an embodiment, when CPR (Current Picture Referencing) mode is applied, MMVD mode is enabled, with CPR-specific adaptations.

Figure 22:
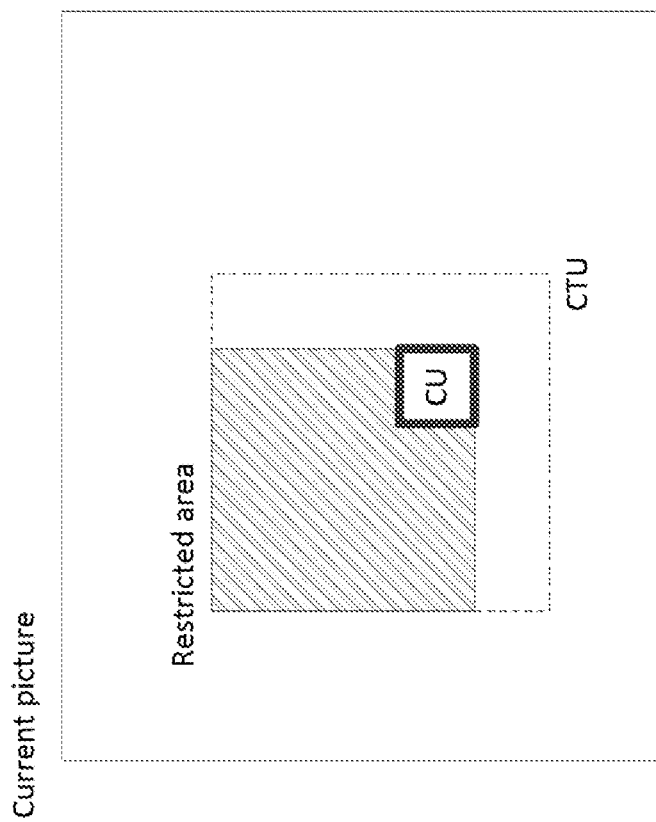
FIG. 22 shows an example of CPR restrictions.

The MV used for CPR refers to the current picture. Restrictions are specified in VVC draft 3 to limit the MV to point inside a restricted area close to the current CU, in order to limit the memory storage needs. In current VTM, the restricted area consists of the CTU that contains the current CU, as illustrated in FIG. 22. The other restriction of the CPR MV is that it has integer precision.

Embodiment 2a—mmvd Restriction to Integer Accuracy for CPR

In an embodiment, the enabled distances for the mmvd are limited to those compatible with the MV accuracy enabled for CPR. For example, in current VTM, the CPR MV accuracy is integer, the invention considers that the distance for mmvd when CPR mode is used in the following set:
{1-pel, 2-pel, 4-pel, 8-pel, 16-pel, 32-pel}
Instead of the full set used normally for mmvd
dist[ ]={¼-pel, ½-pel, 1-pel, 2-pel, 4-pel, 8-pel, 16-pel, 32-pel}
The maximum value N' (e.g. 5) of mmvd_dist_idx in case of CPR is smaller than the maximum value N (e.g. 8) of mmvd_dist_idx.

In an embodiment, this solution is implemented using an offset applied to mmvd_dist_idx as follows:
If MMVD mode is applied
  If CPR mode is applied
    distMV=dist[mmvd_dist_idx+offset]
  else
    distMV=dist[mmvd_dist_idx]
For limiting to integer precision, offset is equal to 2.

Embodiment 2b—Limitation of Maximum Value of mmvd for CPR

In an embodiment, the maximum distance for the mmvd in case CPR mode is activated, is reduced compared to the conventional mmvd usage. For example, in current VTM, the CPR MV accuracy is integer, the invention considers that the distance for mmvd when CPR mode is activated is in the following set:
{1-pel, 2-pel, 4-pel, 8-pel}
Instead of the full set used normally for mmvd
dist[ ]={¼-pel, ½-pel, 1-pel, 2-pel, 4-pel, 8-pel, 16-pel, 32-pel}
The maximum value N' (e.g. 3) of mmvd_dist_idx in case of CPR is smaller than the maximum value N (e.g. 8) of mmvd_dist_idx.

Embodiment 2c—Clipping of MV from mmvd for CPR

Figure 23:
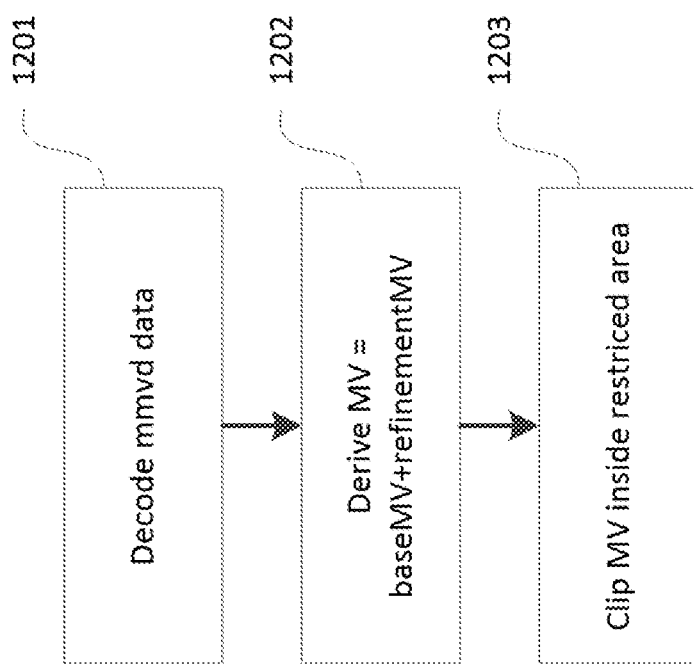
FIG. 23 shows the application of restrictions to CPR MV in MMVD mode.

In an embodiment, the MV resulting from the mmvd refinement is clipped in order that the motion compensated block used for prediction stays inside the restricted area. The basic process is illustrated in FIG. 23.

Embodiment 3: Combination of MMVD and ATMVP

Embodiment 3.1—MMVD Used in Combination with the Sub-Block-Based Mode ATMVP

In VVC draft 3, MMVD only applies to the usual, translational, merge mode. Therefore, MMVD is not used when the sub-block-based merge mode is activated for given CU.

According to this embodiment 3, the MMVD motion vector representation tool can be used when the sub-block merge mode is activated. In particular, MMVD can be used in combination with the ATMVP motion vector prediction mode.

The use of MMVD is signaled in the same way as in VVC draft 3, when the merge_flag syntax indicates the use of the merge mode for current CU. Moreover, the flag sub-block_merge_flag, which indicates the use of the sub-block-based merge mode, is coded regardless of the value of the syntax element mmvd_merge_flag, which indicates the use of MMVD for current block.

According to a first sub embodiment 3.0, the affine mode is not allowed in combination with MMVD. Therefore, if the mmvd_merge_flag is on, then the merge mode used is inferred to be the ATMVP mode. Thus, the merge_idx syntax element is omitted from the coded bit-stream.

According to another sub-embodiment, the affine mode is allowed in combination with MMVD. Thus, the merge_idx syntax element is coded as currently done in VVC draft 3.

Figure 24:
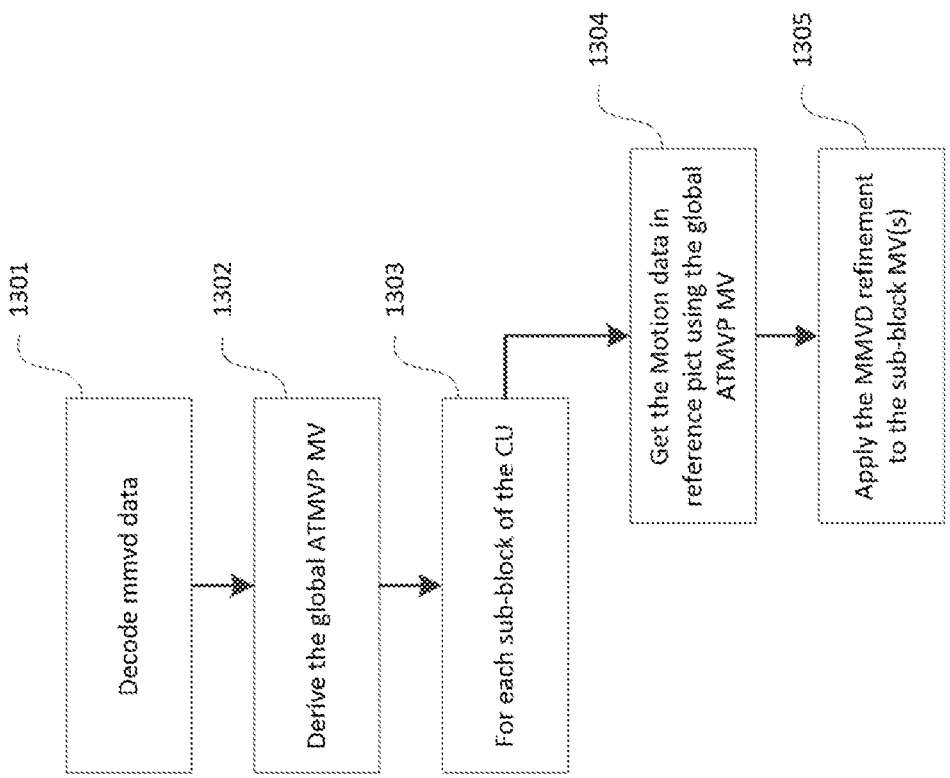
FIG. 24 shows MMVD mode adaptation in case of ATMVP.
Figure 25:
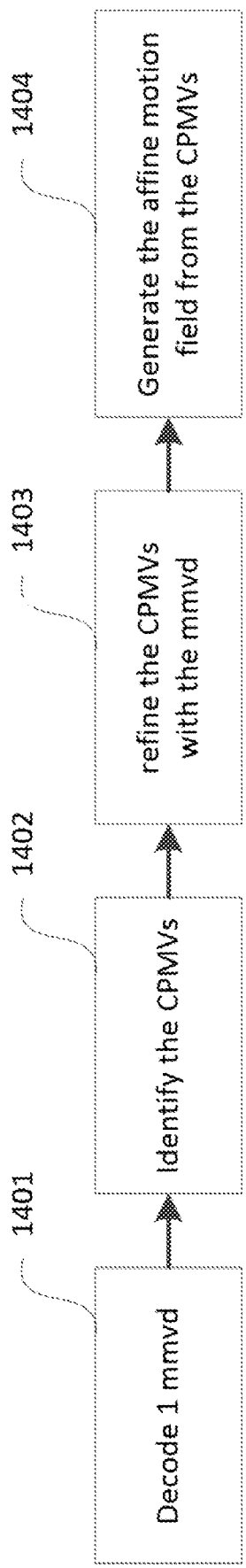
FIG. 25 shows a simplified block diagram of a first version of the Affine motion generation process using MMVD.
Figure 26:
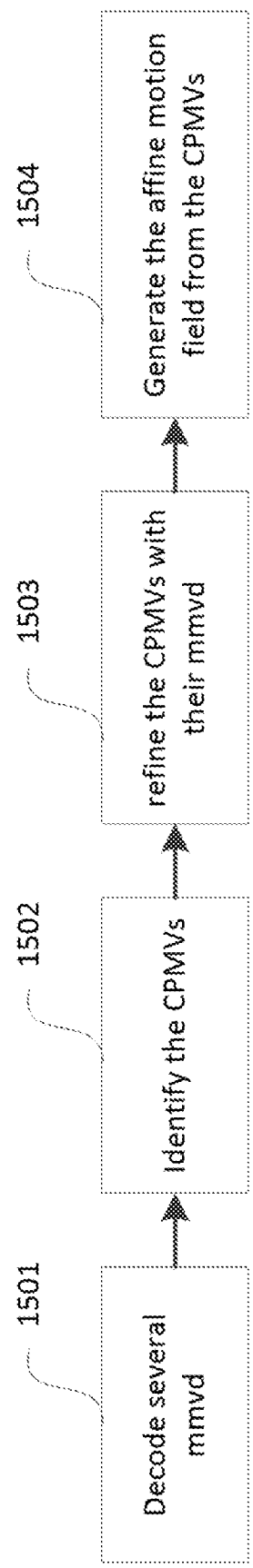
FIG. 26 shows a simplified block diagram of a second version of the Affine motion generation process using MMVD.

Embodiment 3.2—mmvd Used as a Refinement of the Inherited Sub-Block MVs of ATMVP In an embodiment, when ATMVP candidate is selected, and MMVD is enabled, the mmvd refinement applies to all MVs inherited for each sub-block. The process is illustrated in the simplified block diagram of FIG. 24. In a first step the mmv data are decoded. The global ATMVP MV is identified in the next step. Then, for each sub-block of the CU, the motion data from the corresponding sub-block identified in the reference picture by the global MV are fetched. These motion data are refined using the mmvd data, similarly to the conventional MMVD refinement process.

Embodiment 4: Combination of MMVD and Affine Mode

According to an embodiment, MMVD is used in combination with affine mode. Several variants may be applied within this embodiment. They are listed below.

One single mmvd coded for all CPMVs
  According to a first variant, a single motion vector difference mmvd is coded and applied on all CPMVs used to generate the affine motion field. This results in adding a constant motion vector to the whole affine motion model. This is illustrated in the figure below depicting a simplified decoding block diagram of the affine motion field generation process when MMVD mode is activated.
  In case of bi-directional affine prediction, the same symmetrical motion vector difference concept is used as in the translational case.

mmvd Data Coded for Each of the CPMVs
  According to a second variant, one motion vector difference mmvd per CPMV is allowed, which increases the flexibility to generate candidate affine motion field. The regular mmvd coding of MMVD may be used for the first CPMV. Next, for the second and third CPMV, a differential motion vector difference (mmvdd) may be coded on top of the mmvd associated to the first CPMV. The advantage of such approach is to limit the rate cost of the mmvd signaling, while allowing some flexibility in the MMVD application to the affine mode. An example of related simplified syntax is depicted below in case of coding of mmvd information for the 3 affine CPMVs. According to this embodiment, the magnitude of the differential motion vector difference(s) may be restricted to smaller values than the mmvd of the first CPMV (e.g. limited to dist[ ]={¼-pel, ½-pel, 1-pel}, while the full set of values can be dist[ ]={¼-pel, ½-pel, 1-pel, 2-pel, 4-pel, 8-pel, 16-pel, 32-pel}). The process is illustrated in the figure below depicting a simplified decoding block diagram of the affine motion field generation process when MMVD mode is activated.

```
mmvd_flag                          ae(v)
if( mmvd_flag == 1 ) {
    mmvd0_dist_idx
    mmvd0_dir_idx
    mmvdd1_dist_idx
    mmvd1_dir idx
    mmvdd2_dist_idx
    mmvd2_dir_idx
}
```

Figure 27:
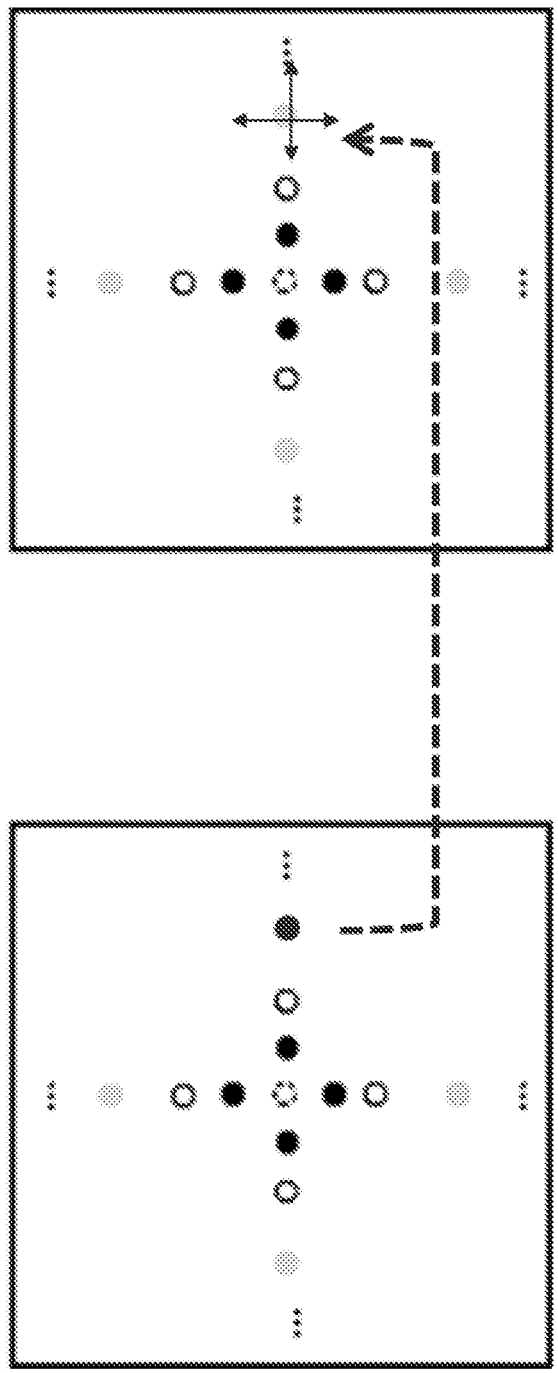
FIG. 27 shows a limitation of the allowed magnitude for differential MVD based on the MVD index used for the first CPMV of the considered affine motion field.

According to some variants, in the coding of the differential mmvd, the range of allowed magnitude is limited according to the distance index associated to the mmvd of the first CPMV. For instance, mmvd1_dist_idx, and when applicable mmvd2_dist_idx, is constrained to be lower than mmvd0_dist_idx. The allowed range of the second mmvd in the horizontal and vertical orientations may be limited as exemplarily shown on FIG. 27.

According to a further variant, the same direction index is used for all mmvd, thus only a distance information may be coded for the second and third CPMVs. An example of related simplified syntax is depicted below in case of coding of mmvd information for the 3 affine CPMVs.

```
mmvd_flag                          ae(v)
if( mmvd_flag == 1 ) {
    mmvd0_dist_idx
    mmvd0_dir_idx
    mmvdd1_dist_idx
    mmvdd2_dist_idx
}
```

Restricting the Affine Merge Candidates List by Removing Virtual Candidates

According to a further variant, since the MMVD mode used for Affine brings some diversity in the set of affine merge candidates, the affine list of affine merge candidates is reduced compared to the affine merge list of the VVC draft 3, leading to a simplified overall codec design. For instance, in an embodiment, some the constructed (virtual) affine model candidates are suppressed from the affine merge list. In an embodiment, all the constructed (virtual) affine model candidates are suppressed from the affine merge list, and the affine merge list is only made of inherited affine candidates.

Constraining the Distance Value of the $2^{nd}$ (and $3^{rd}$) mmvd Based on the Distance Value of the $1^{st}$ mmvd According to an additional characteristic, for the second CPMV and third CPMV (when it applies), the differential coding of the mmvd (motion vector difference) over the mmvd of the first CPMV includes the possibility to code/decode the distance value 0 for the differential motion vecto difference (dist[ ]={0-pel, ¼-pel, ... }). Indeed, in the existing MMVD which is applied only in the translational motion case, the distance equal to 0 is not supported because it would provide a MV predictor redundant with the usual merge one.

Imposing Symmetrical Constraints to the Affine Model Parameters in Case of Bi-Directional Affine According to a further characteristic, in case of bi-directional affine, the derivation of the second mmvd (attached to the second reference picture) as a function of the first one (attached to the first reference picture) uses a symmetry constraint, similarly to the symmetry constraint between the two bi-prediction mmvd imposed in the translational case. To do so, several approaches may be possible.

In one first approach, the mmvd of the mmvd associated to the second reference picture list is directly deduced from the mmvd associated to the first reference picture list. For instance, the second mmvd is derived by scaling the first mmdv, the scaling taking into account the temporal distance between the reference pictures and the current picture.

In another approach, the MVDs of the affine model associated to the second reference picture list is deduced from the first one, by imposing that the affine model parameters (that are typically linked to an angle and scaling factor), are symmetrical compared to the MVD of the affine model associated to the first reference picture. To do so, the scaling factor and angle values associated to the first affine model are computed. Then they are transformed to fulfill the symmetry constraint, then the affine mode parameters are inverse transform to provide the second affine model of the current CU, for the bi-directional affine prediction of the CU. This takes the following form.

Suppose the 4-parameter model is used for the considered block:

$$\begin{cases} v_x = a.x - b.y + v_{0x} \\ v_y = b.x + a.y + v_{0y} \end{cases}$$

Then the rotation angle and scaling parameters are obtained as follows:

$$\begin{cases} \theta = \operatorname{atan} 2(a, b) \\ s = \sqrt{a^2 + b^2} \end{cases}$$

The angle and scaling factor are then transformed as follows:

$$\begin{cases} \theta' = -k.\theta \\ s' = k.s^{-1} \end{cases}$$

Where k is a scaling factor depending on the temporal distances between the current picture and its two reference pictures. Finally, the a' and b' affine model parameter for the second reference picture are easily computed from a' and b'.

In a simplified version, only the scaling factor is modified, resulting in a simple scaling of the MVd.

Embodiment 5: Combination of MMVD and Planar Motion Vector Prediction

According to the embodiment 5, MMVD is used in combination with the Planar Motion Vector Prediction (PMVP) mode.

This may take one of the following forms.

One Single mmvd Refining Each of the MV of the PMVP Motion Field

According to a first basic approach, the MMVD motion vector difference is coded in case the PMVP mode is used for current CU. The mmvd is applied to the PMVP generated motion field, initially generated from its generator MVs. Hence, the mmvd is used as an additive offset onto each MV of the PMVP motion field. This is illustrated in the figure below depicting a simplified decoding block diagram of the PMVD motion generation process.

Figure 28:
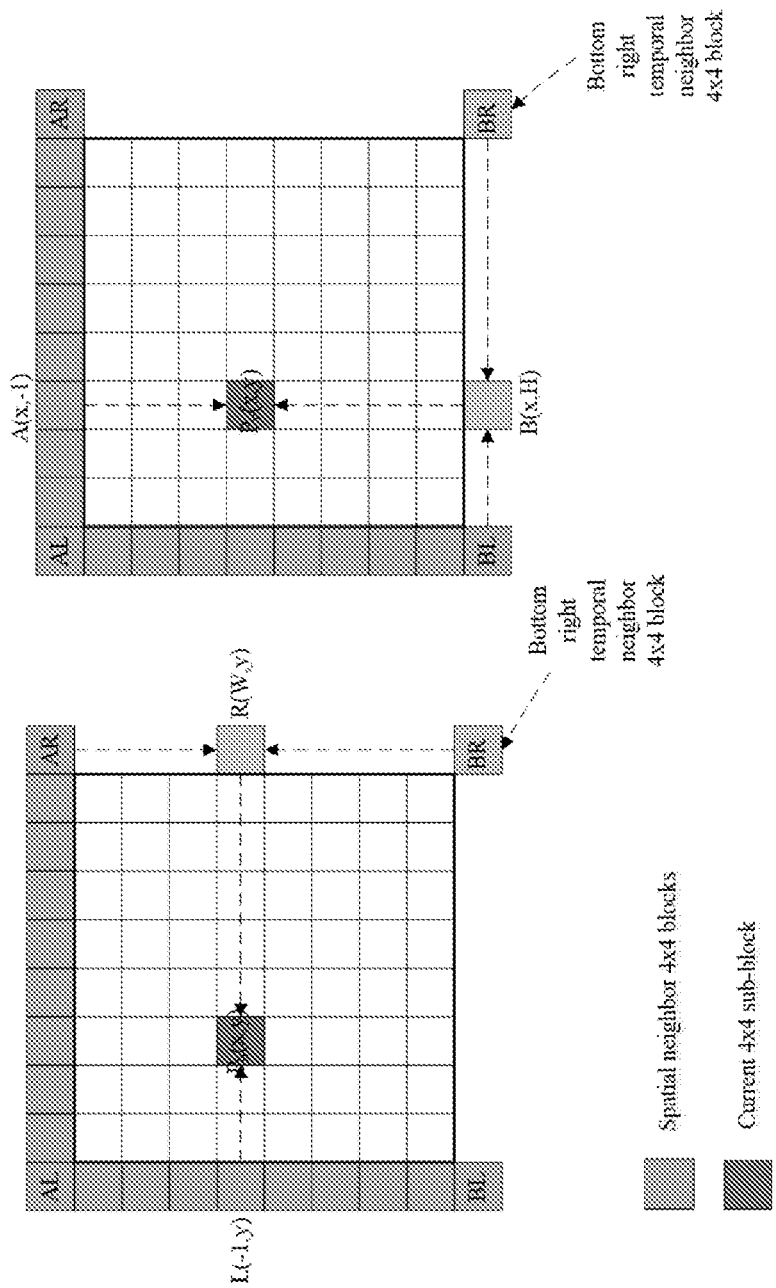
FIG. 28 shows an example of planar MVP mode, being combined with MMVD.

One Single mmvd Used to Refine at Least One of the MVs Used to Generate the PMVD Motion Field According to another variant, one motion vector difference is applied on at least one motion vector used to generate the planar motion field (generator MVs). For instance, a single MVD may be coded and applied onto the AL (Above Left) motion vector of FIG. 28, before generating the planar MV field. This is illustrated in the figure below depicting a simplified decoding block diagram of the PMVD motion generation process.

According to another variant, a MVD is coded and applied onto the BR motion vector, before generating the planar MV field.

According to another variant, a MVD is coded and applied onto the AR motion vector, before generating the planar MV field.

According to another variant, a MVD is coded and applied onto the BL motion vector, before generating the planar MV field.

Several mmvds Used to Refine Several MVs Used to Generate the PMVD Motion Field

According to another embodiment, several MVDs are coded and applied onto one or several MV among the AL, BL, AR and BR motion vectors, before generating the planar motion field. This is illustrated in the figure below depicting a simplified decoding block diagram of the PMVD motion generation process.

According to another embodiment, when several MVDs are coded and applied onto several MVs among the AL, BL, AR and BR motion vectors, the first coded MVD is coded as in MMVD. The next ones are coded in a differential way based on the previous coded one, so as to limit the rate cost associated to the MVD coding process.

According to a variant, the set of allowed distances for the MVD in the planar case is modified compared to the MMVD tool currently used in VVC draft 3. For instance, a restricted range of allowed MVD distance is allowed.

According to a variant, the number of allowed MVD orientations is modified compared to the existing MMVD system in VVC draft 3. For instance, an enriched set of MVD angles may be supported, when MMVD is used in combination with planar MV prediction.

Embodiment 6: Combination of MMVD and Regression-Based Motion Vector Field

According to the embodiment 5, MMVD is used in combination with the regression-based 6-parameter motion field introduced in the section on the regression MVF model. This may take one of the following forms.

One Single mmvd Refining Each of the MV of the RMVF Motion Field

Figure 29:
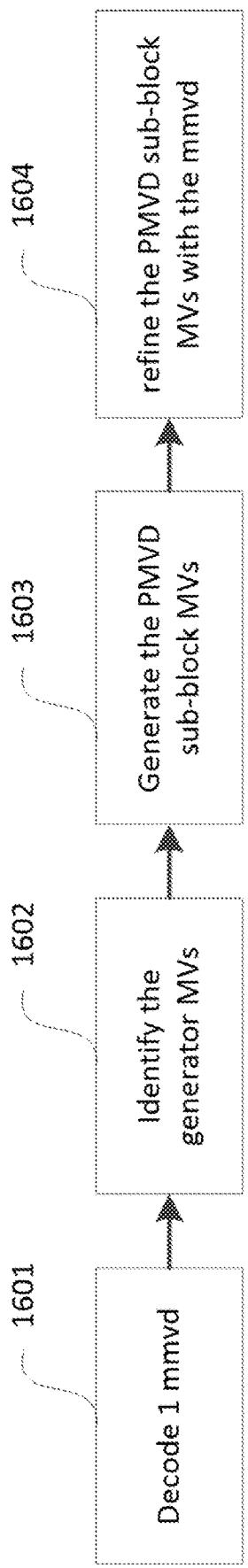
FIG. 29 shows a simplified block diagram of a first version of the PMVD motion generation process using MMVD.

According to a first basic approach, the MMVD motion vector difference is coded in case the RMVF mode is used for current CU and is applied to RMVF generated motion field. Hence, the MVd is used as an additive offset onto the RMVF motion field. A similar block diagram as depicted in FIG. 29 can properly describe the simplified process for generating the RMVF motion field according to this variant.

One Single mmvd Used to Refine at Least One of the MVs Used to Generate the RMVF Motion Field According to another variant, one motion vector difference is applied on at least one motion vector used to generate the RMVF motion field. For instance, a single MVD may be coded and applied onto motion vectors on the left of current block, before generating the RMVF motion field.

Figure 30:
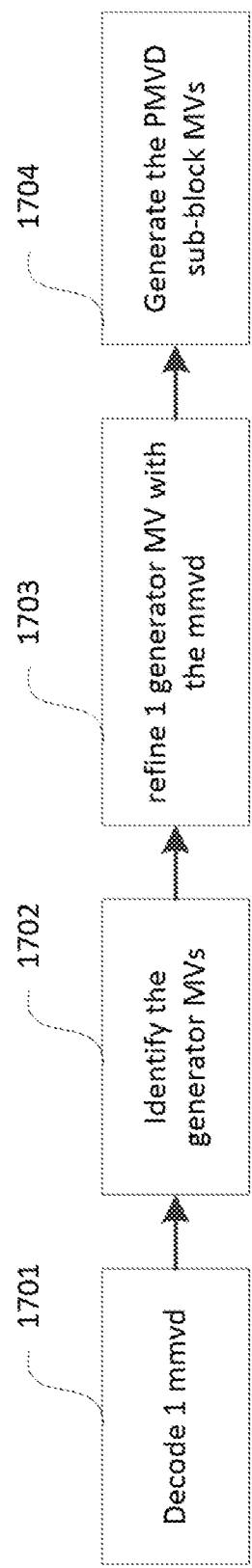
FIG. 30 shows a simplified block diagram of a second version of the PMVD motion generation process using MMVD.

According to another variant, one MVD is coded and applied onto the top neighboring motion vectors, before generating the regression-based MV field. A similar block diagram as depicted in FIG. 30 can properly describe the simplified process for generating the RMVF motion field according to this variant.

Two mmvds Used to Refine Two MVs Used to Generate the RMVF Motion Field

According to another embodiment, two MVDs are coded and applied respectively onto the top and the left MVs, before generating the regression-based motion field.

According to another embodiment, when two MVDs are coded and applied as stated above, the first coded MVD is coded as in MMVD. The next one is coded in a differential way based on the first one, so as to limit the rate cost associated to the MVD coding process.

According to a variant, the set of allowed distances for the MVD in the regression-based case is modified compared to the MMVD tool currently used in VVC draft 3. For instance, a restricted range of allowed MVD distance is allowed.

According to a variant, the number of allowed MVD orientations is modified compared to the existing MMVD system in VVC draft 3. For instance, an enriched set of MVD angles may be supported, when MMVD is used in combination with RMVF.

Figure 31:
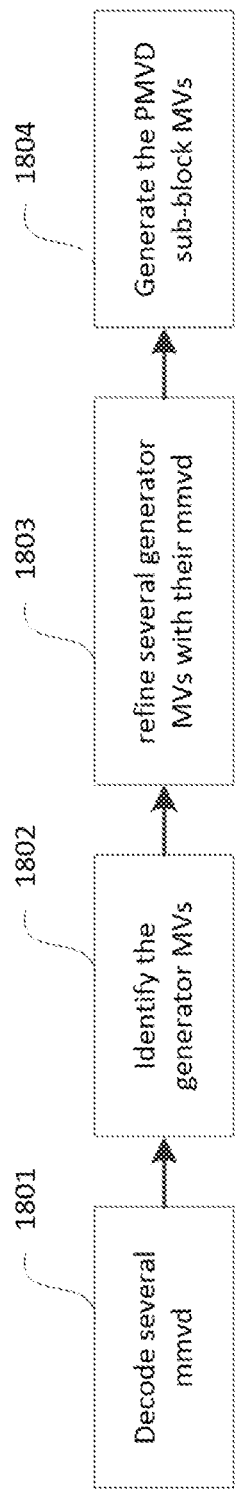
FIG. 31 shows a simplified block diagram of a third version of the PMVD motion generation process using MMVD.
Figure 32:
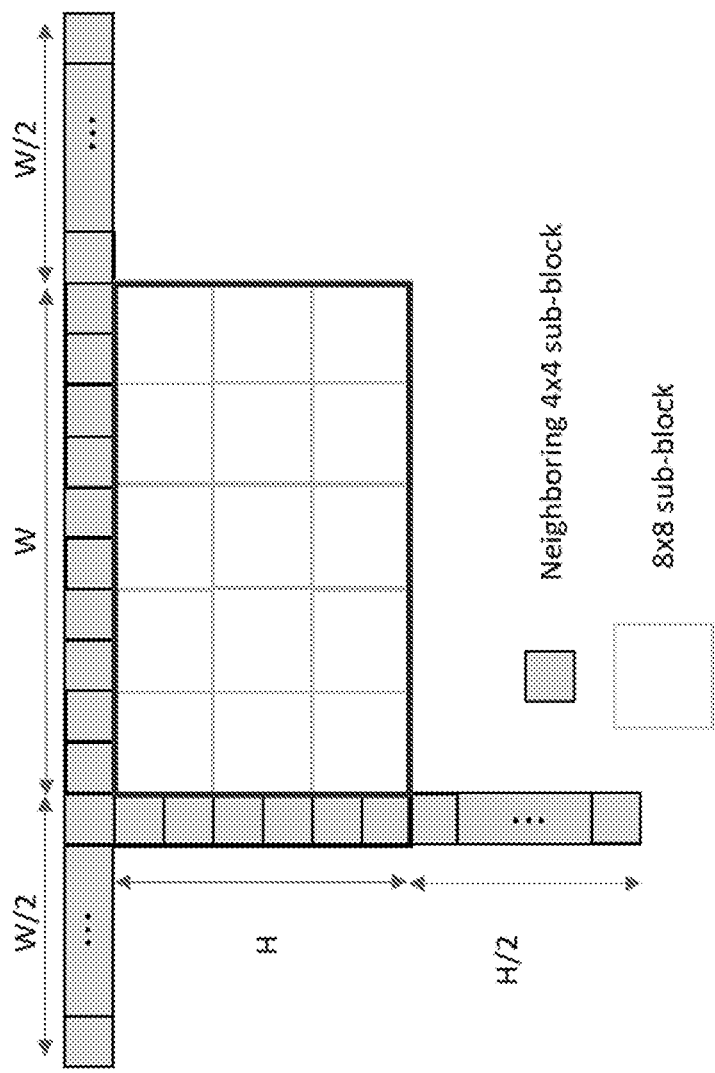
FIG. 32 shows a regression-based motion vector field construction.
Figure 33:
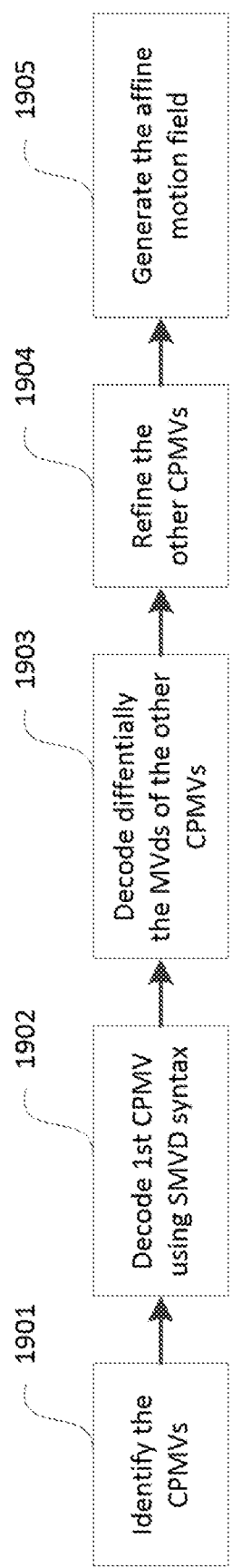
FIG. 33 shows a simplified block diagram of a version of the affine motion generation process using SMVD.

A similar block diagram as depicted in FIG. 31 can properly describe the simplified process for generating the RMVF motion field according to those variants.

Embodiment 7: Combination of MMVD with LIC

In an embodiment, MMVD and LIC can be enabled together. In that case, the coded motion vector difference is applied onto the considered CU's motion vector as is the case in the VVC draft 3. Therefore, the LIC linear model parameters associated the temporal prediction of the current CU are derived from the used merge candidate as is the case in current LIC tool.

According to a variant, the LIC flag of the current CU may be set to false, i.e. LIC temporal prediction refinement may be deactivated for current CU, if the MVD magnitude is above certain threshold. Indeed, intuitively, if the motion vector of current CU is significantly different from the motion vector of the merge candidate used to derive the MV of current CU, then the LIC linear model used for the merge candidate CU may not be relevant for current CU.

For instance, if the MVD magnitude is higher or equal to 16 or 32, the LIC mode may be forced to 0 for current CU.

According to a further variant, the above-mentioned threshold on the MVD magnitude may depend on the current CU size.

Embodiment 8: Combination of MMVD with GBI

In VVC draft 3, when a CU is coded in translational merge mode, its motion vector is derived from a selected merge candidate, and from its GBI index. This means the GBI weights of the CU which serves as reference to derive the current CU motion data are also used, unchanged, for current CU, including in the case MMVD is activated for current CU.

In this current embodiment, an adaptation of the GBI weights for current CU may apply, based on the magnitude of the MVD used for the current merge CU.

For example, if the MVD magnitude is above certain threshold, GBI may be reset to the default GBI weights (½,½) for current CU. Indeed, intuitively, if the motion vector of current CU is significantly different from the motion vector of the merge candidate used to derive the MV of current CU, then the GBI weights used for the merge candidate CU may not be relevant for current CU.

For instance, if the MVD magnitude is higher or equal to 16 or 32, the GBI weights may be forced to (½,½) for current CU.

According to a further variant, the above-mentioned threshold on the MVD magnitude may depend on the current CU size.

Embodiment 9: MMVD and Triangle Motion Partitions

According to an embodiment, the MMVD motion vector coding tool is used in combination with the triangle motion partitioning tool.

According to a first variant, one MVD is coded for each triangular partition, following the VVC draft 3 MVD coding system of MMVD.

According to another variant, a single MVD is coded and commonly used by the two triangular motion partitions.

According to another variant, when two MVD are coded, the second one is coded in a differential way over the first one. In that case, the second MVD may be restricted to a smaller allowed range of magnitude, in the same way as for the affine case (see section on Embodiment 4).

According to a more advanced embodiment, in case to MVDs are coded, one for each partition, the second MVD is coded in a conditional way based on the relative values of the motion vectors of the first and second partition. For instance, the second MVD may be restricted so that the second refine MV is not to close to the refined MV of the first triangular partition. Indeed, if to close, the overall prediction of the current CU may behave very closely to the usual translational motion compensated prediction of the whole rectangular block.

Embodiment 10: MMVD and Multi-Hypothesis (MH) Prediction

In current video standards, such as VVC draft 3, a new prediction mode called multi-hypothesis, consists in a combined prediction of a merge/skip temporal predicted block and an intra predicted block.

However, in VVC draft 3, MMVD and MH prediction cannot be used together.

In this embodiment, it is allowed to use the MMVD and the multi-hypothesis prediction mode in a combined way.

Basically, this consists in applying a merge motion vector difference onto the merge or skip candidate motion vector used to derive the motion information of the current coding unit.

The advantage of this embodiment is a further increased coding efficiency.

Embodiment 11: MMVD and Spatial-Temporal Motion Vector Prediction (STMVP)

In the VVC draft 3, a motion vector prediction mode called STMVP is being proposed, as described in section on Non-sub-block spatial temporal merge motion vector predictor. The STMVP motion vector candidate is an additional merge candidate, which may typically be part of the translational merge candidate list. It consists in predicting a single motion vector for the current CU. Thus, MMVD can be applied to the STMVP candidate in a straightforward way.

However, MMVD may apply also to only one of the 3 spatial and temporal MV predictors used to compute the STMVP candidate.

According to an embodiment, the motion vector difference of MMVD is applied on the one or two spatial motion vector predictors, before compute the average motion vector between these two spatial motion vector predictors and the temporal motion vector predictor.

According to an embodiment, the motion vector difference of MMVD is applied on the temporal motion vector predictors, before computing the average motion vector between this temporal MV predictor and the one or two spatial motion vector predictors.

Proposed Embodiments for Extending the Use of SMVD

Embodiment 12: SMVD Replaced by MMVD in AMVP Mode

As stated in the symmetrical MVC section, the SMVD motion vector coding mode only applies in AMVP mode, whereas the MMVD motion vector representation mode only applies in merge mode. In this embodiment, the codec design is harmonized. Only one motion vector coding mode among MMVD and SMVD is proposed for the whole design, to handle both the cases of symmetrical bi-directional motion and the case of low-magnitude motion vectors in the merge context.

The two following variants are proposed.

Using the mmvd Syntax for Coding the MV Differences in Both MMVD and SMVD Modes

In AMVP mode, when the symmetric mode is on, then the motion vector differences are coded with the MMVD MVD coding syntax depicted in the MMVD motion vector difference coding tool description section. Thus, the classical MVD coding method of the VVC draft 3 in AMVP is replaced if the symmetrical MVD mode is active for the considered CU.

Using the VTM3 MVd Syntax for Coding the MV Differences in Both MMVD and SMVD Modes In AMVP mode, when the symmetric mode is on, then the motion vector differences are coded as currently done in the VVC draft 3 in AMVP. However, if the MMVD mode is on in the merge case, then the motion vector difference of MMVD is coded in the AMVP way.

Embodiment 13: SMVD Combined with Affine Motion Model

According to an embodiment, the SMVD usage is extended to the affine AMVP case. This may take the following form.

The first CPMV of the considered affine CU is coded according to the SMVD mode of the section on symmetrical MVD, as in the classical translational AMVP case. Next, the MVD of other CPMV of the considered affine CU are coded differentially over the first CPMV's MVD, as is currently done in the affine AMVP case. A corresponding simplified block diagram is depicted in the figure below.

According to a further variant, the differential MVD of the second and optionally third CPMVs are coded differentially over the MVD of the first CPMV, but also under the symmetrical mode constraint. This enables reducing the rate cost of the second and third CPMVs.

Embodiment 14: SMVD Combined with Triangular Motion Partitions

The symmetrical MVD mode may be extended to the triangle partition case, if triangle partitions are used in AMVP.

In such case, in an embodiment, the two uni-dir MVDs of the first and second triangular partitions may be symmetrical with each other.

Embodiment 15: SMVD Combined with Multi-Hypothesis Prediction Mode

In an embodiment, the multi-hypothesis may be used in AMVP mode in addition to the merge mode. In that case, the SMVD mode may be used in combination with the multi-hypothesis prediction mode, in the case the Inter component of this inter/intra compound prediction is using bi-prediction.

Embodiment 16: SMVD Combined with Planar Motion Model

In an embodiment, the planar motion model may be used in AMVP mode, in addition to its current usage in the merge mode. In that case, a motion difference may be used and applied onto the motion vectors surrounding the current CU and used to generate the current CU's motion field.

Furthermore, the SMVD mode may be used in combination with this AMVP planar motion model case. In that case, some symmetrical bi-directional motion vector differences may be applied onto the surrounding motion vectors of current CU, used to generate the planar MV field of current CU. Such embodiment would be analogous to that of section covering Embodiment 5, but in the AMVP+symmetrical mode case.

Embodiment 17: SMVD Combined with Regression-Based Motion Model

In an embodiment, the regression-based motion model may be used in AMVP mode in addition to its current usage in the merge mode. In that case, a motion difference may be used applied onto the motion vectors surrounding the current CU and used to generate the current CU's regression-based motion field Furthermore, the SMVD mode may be used in combination with this AMVP regression-based motion model case. In that case, some symmetrical bi-directional motion vector differences may be applied onto the surrounding motion vectors of current CU, used to generate the regression-based MV field of current CU. Such embodiment would be analogous to that of section covering Embodiment 5, but in the AMVP+symmetrical mode case.

Embodiment 18: SMVD Combined with ATMVP Motion Model

Exclusive Because AMVP and Merge

In an embodiment, the ATMVP motion model may be used in AMVP mode in addition to its current usage in the merge mode. In that case, a motion difference may be used applied onto the motion vectors contained in the ATMVP predicted motion vectors of the current CU.

Furthermore, the SMVD mode may be used in combination with this AMVP ATMVP motion model case. In that case, some symmetrical bi-directional motion vector differences may be applied onto the ATMVP motion vectors derived for the current CU.

Such embodiment would be analogous to that of section covering Embodiment 3, but in the AMVP+ATMVP mode case.

Embodiment 19: SMVD Combined with Spatial-Temporal Motion Vector Prediction (STMVP)

In current video standard proposals, such as VVC draft 3, the STMVP motion vector predictor (see section on STMVP) is being proposed only in the merge case. However, STMVP may be allowed in the AMVP mode. In that case, SMVD may be applied to the STMVP candidate in a straightforward way.

However, SMVD may apply also to only one of the 3 spatial and temporal MV predictors used to compute the STMVP candidate.

According to an embodiment, the motion vector difference of SMVD is applied on the one or two spatial motion vector predictors, before compute the average motion vector between these two spatial motion vector predictors and the temporal motion vector predictor.

According to an embodiment, the motion vector difference of SMVD is applied on the temporal motion vector predictors, before compute the average motion vector between this temporal MV predictor and the one or two spatial motion vector predictors.

1.1.2. Embodiment 20: Modified SMVD Mode to Impose the Symmetry of the Final Couple of Bi-Directional Motion Vectors. Translational Case This section presents an embodiment where the SMVD mode is modified so that the symmetry constraint is not imposed on the motion vector difference MVd, but on the final motion vectors used to bi-dir predict a block in the translational AMVP mode.

Indeed, as explained in section covering symmetrical MVD, in SMVD, the MVD is coded for a first motion vector of a couple of bi-dir MVs, and then the MVD of the second motion vector is deduced from the first MVD as the opposite MVD vector, possible scaled as a function of the temporal distance between the current picture and its reference pictures.

Here, in the proposed embodiment, the modified SMVD mode is such that the MVD of the first vector is coded as in the existing SMVD. Next the first motion vector is reconstructed as the sum of the MV predictor and the decoded motion vector difference.

Finally, the reconstructed second motion vector is deduced from the reconstructed first motion vector, as the opposite MV, possible scaled as a function of the temporal distance between current picture and its reference pictures.

This way, the proposed new SMVD mode ensure that the predicted block lies on the same line as its two backward and forward reference blocks. This approach is expected to provide improved coding efficiency compared to the existing SMVD of section covering symmetrical MVD.

Embodiment 21: Modified SMVD Mode to Impose the Symmetry of the Final Affine Model (Rotation, Scale/Zoom and Translation)

According to an embodiment, the SMVD mode is used in combination with affine AMVP. In that case, the symmetry constraint may either imposed onto the affine MVDs in a straightforward way.

According to another approach, the symmetry constraint may be imposed onto the affine model parameters (angle and scaling factor), in a similar way as the corresponding characteristics of section on Embodiment 4 relative to the combination of MMVD and affine.

Figure 35:
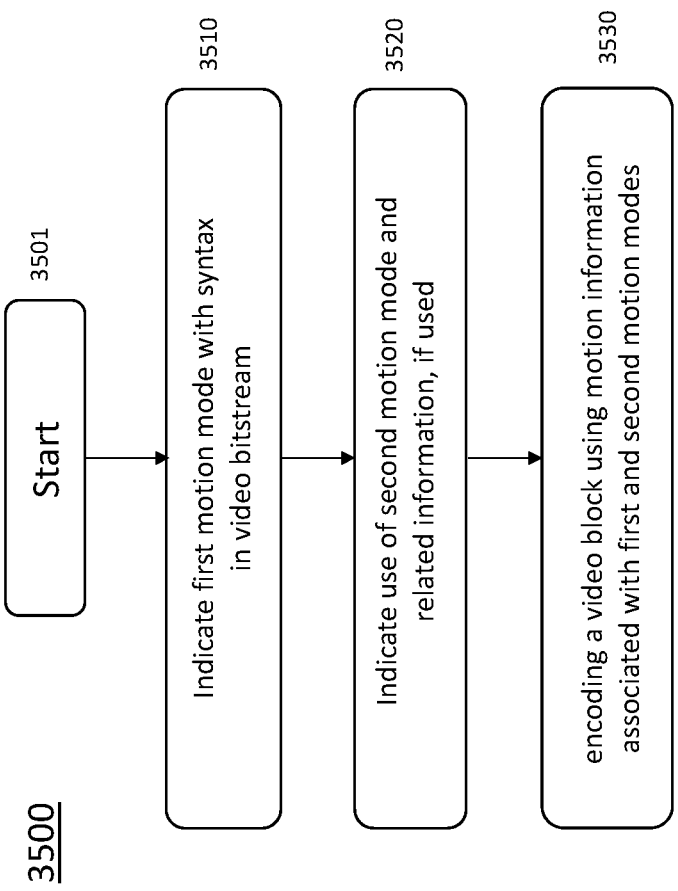
FIG. 35 shows one embodiment of a method for encoding under the general described aspects.

One embodiment of a method 3500 under the general aspects described here is shown in FIG. 35. The method commences at start block 3501 and control proceeds to block 3510 for indicating a first motion mode through syntax in a video bitstream. Control proceeds from block 3510 to block 3520 for indicating use of a second motion mode through presence of syntax in the video bitstream, and if present, including information related to the second motion mode. Control proceeds from block 3520 to block 3530 for encoding a video block using motion information corresponding to the first and second motion modes.

Figure 36:
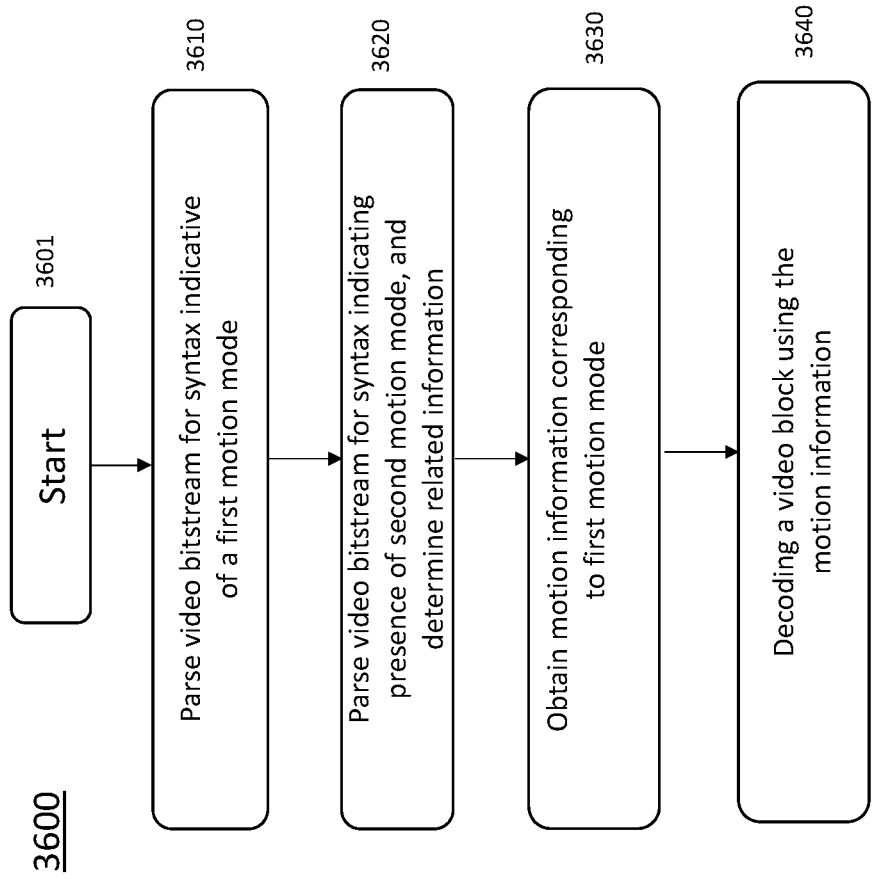
FIG. 36 shows one embodiment of a method for decoding under the general described aspects.

Another embodiment of a method 3600 under the general aspects described here is shown in FIG. 36. The method commences at start block 3601 and control proceeds to block 3610 for parsing a video bitstream for syntax indicative of a first motion mode. Control proceeds from block 3610 to block 3620 for parsing the video bitstream for syntax indicating presence of a second motion mode, and if present, determining information related to said second motion mode. Control proceeds from block 3620 to block 3630 for obtaining motion information corresponding to said first motion mode. Control proceeds from block 3630 to block 3640 for decoding the block using said motion information.

FIG. 37 shows one embodiment of an apparatus 3700 for encoding, decoding, compressing or decompressing video data using simplifications of coding modes based on neighboring samples dependent parametric models. The apparatus comprises Processor 3710 and can be interconnected to a memory 3720 through at least one port.

Both Processor 3710 and memory 3720 can also have one or more additional interconnections to external connections.

Processor 3710 is also configured to either insert or receive information in a bitstream and, either compressing, encoding or decoding using any of the described aspects.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 3:
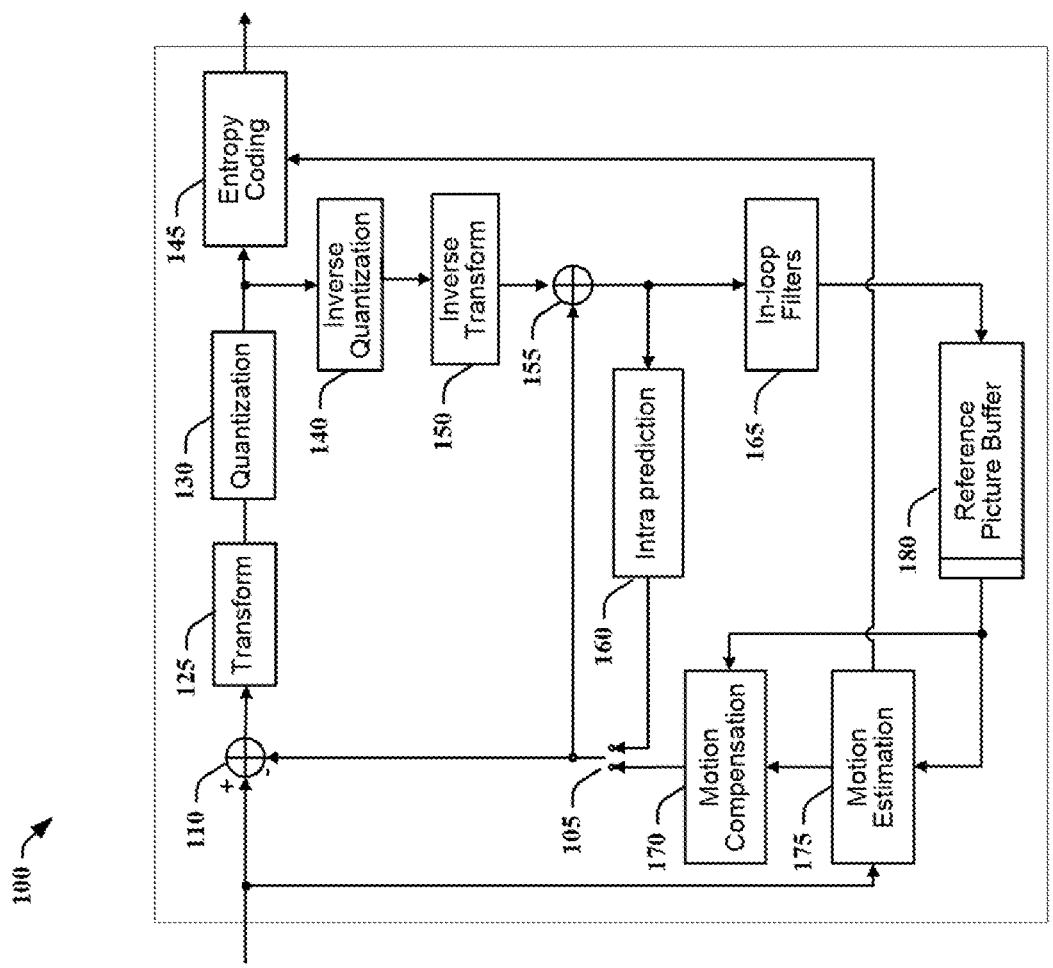
FIG. 3 shows a standard, generic video compression scheme.
Figure 4:
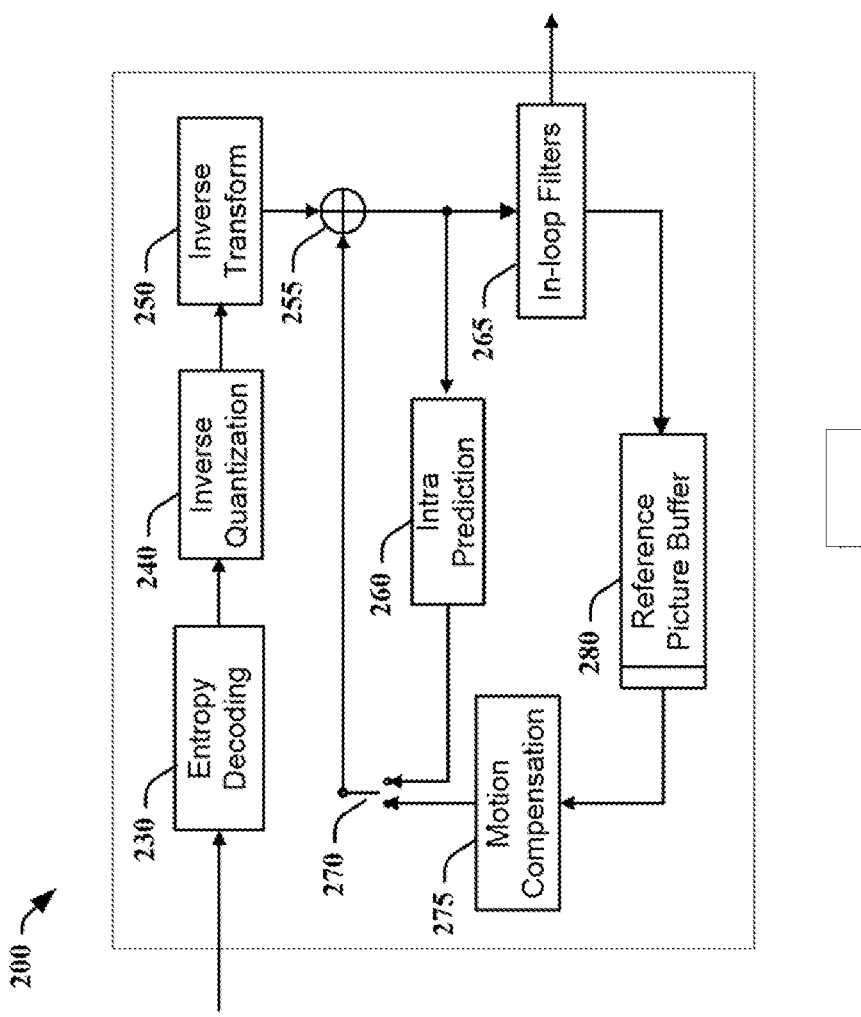
FIG. 4 shows a standard, generic video decompression scheme.
Figure 34:
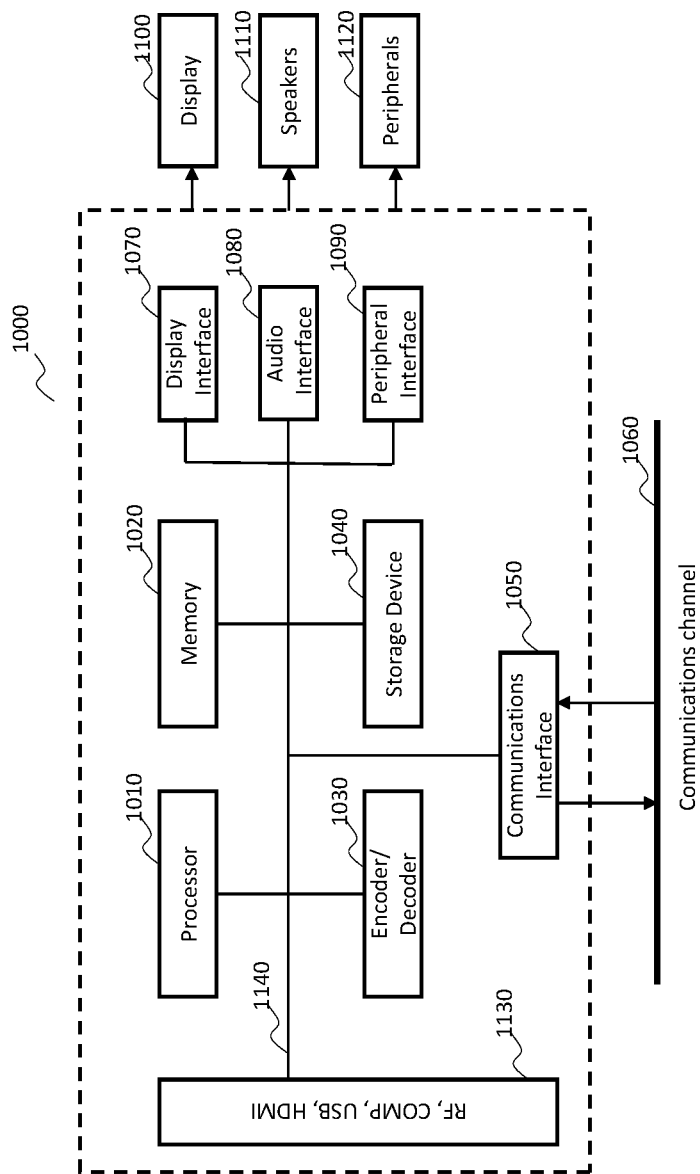
FIG. 34 shows a processor-based system for encoding and decoding for the described aspects.

The aspects described and contemplated in this application can be implemented in many different forms. FIGS. 3, 4 and 34 provide some embodiments, but other embodiments are contemplated and the discussion of FIGS. 3, 4 and 34 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 3 and FIG. 4. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 3 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 4 illustrates a block diagram of a video decoder 200. In the decoder 200, a bitstream is decoded by the decoder elements as described below. Video decoder 200 generally performs a decoding pass reciprocal to the encoding pass as described in FIG. 3. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 34 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 34, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to use MMVD and/or SMVD with an affine motion model.

A process or device to use MMVD and/or SMVD with alternative temporal motion vector prediction.

A process or device to use MMVD and/or SMVD with a bi-directional optical flow.

A process or device to use MMVD and/or SMVD with motion vector referencing to a current picture.

A process or device to use MMVD and/or SMVD with generalized bi-prediction.

A process or device to use MMVD and/or SMVD with local illumination compensation.

A process or device to use MMVD and/or SMVD with multi-hypothesis combined merge/intra modes.

A process or device to use MMVD and/or SMVD with merge with MVD, or Ultimate MV Expression.

A process or device to use MMVD and/or SMVD with motion vector field per subblock based on regressive model.

A process or device to use MMVD and/or SMVD with symmetrical MVD, only 1 MVD coded in bi-prediction.

A process or device to use MMVD and/or SMVD with triangular partitions.

A process or device that combines MMVD and bi-prediction.

A process or device that combines MMVD and CPR.

A process or device that combines MMVD and ATMVP.

A process or device that combines MMVD and Affine mode.

A process or device that combines MMVD and Planar Motion Vector prediction.

A process or device that combines MMVD and regression-based motion vector field.

A process or device that combines MMVD with GBI.

A process or device that combines MMVD and spatial-temporal motion vector prediction.

A process or device that replaces SMVD by MMVD in AMVP mode.

A process or device that combines SMVD with affine motion model.

A process or device that combines SMVD with planar motion model.

A process or device that combines SMVD with regression-based motion model.

A process or device that combines SMVD with ATMVP motion model.

A process or device that combines SMVD with spatial-temporal motion vector prediction.

A process or device that modifies SMVD mode to impose symmetry on bi-directional motion vectors in a translational case.

A process or device that modifies SMVD mode to impose symmetry on a final affine model comprising rotation, scaling, zooming, or translation.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
indicating use of a merge mode with motion vector difference through syntax in a video bitstream;
indicating use of a bi-prediction mode through syntax in the video bitstream; and, responsive to the syntaxes:
encoding a first set of merge mode with motion vector difference indices for a first reference picture;
obtaining a second set of merge mode with motion vector difference indices wherein a direction index for said second set is obtained based on a direction index encoded for said first set;
encoding the second set without said direction index; and
encoding a block of a current picture using indices of said first and second sets.

2. An apparatus, comprising:
a processor, configured to:
indicate use of a merge mode with motion vector difference through syntax in a video bitstream;
indicate use of a bi-prediction mode through syntax in the video bitstream; and, responsive to the syntaxes:
encode a first set of merge mode with motion vector difference indices for a first reference picture;
obtain a second set of merge mode with motion vector difference indices wherein a direction index for said second set is obtained based on a direction index encoded for said first set;
encode the second set without said direction index; and
encode a block of a current picture using indices of said first and second sets.

3. A method, comprising:
parsing a video bitstream for syntax indicative of use of a merge mode with motion vector difference;
parsing the video bitstream for syntax indicative of use of a bi-prediction mode; and, responsive to at least one of said syntaxes:
decoding a first set of merge mode with motion vector difference indices for a first reference picture;
obtaining a second set of merge mode with motion vector difference indices for a second reference picture, wherein a direction index for said second set is obtained based on a direction index decoded for said first set; and
decoding a block of a current picture using indices of said first and second sets.

4. An apparatus, comprising:
a processor, configured to:
parse a video bitstream for syntax indicative of use of a merge mode with motion vector difference;
parse the video bitstream for syntax indicative of use of a bi-prediction mode; and, responsive to at least one of said syntaxes:
decode a first set of merge mode with motion vector difference indices for a first reference picture;
obtain a second set of merge mode with motion vector difference indices for a second reference picture, wherein a direction index for said second set is obtained based on a direction index decoded for said first set; and
decode a block of a current picture using indices of said first and second sets.

5. A device comprising:
the apparatus of claim 4; and
at least one of (i) an antenna configured to receive a signal, the signal including the block of the current picture, (ii) a band limiter configured to limit the received signal to a band of frequencies that includes the block of the current picture, and (iii) a display configured to display an output representative of the block of the current picture.

6. A non-transitory computer readable medium containing data content generated according to the method of claim 1, for playback using a processor.

7. A computer program product comprising instructions which, when the program is executed by a computer, cause the computer to carry out the method of claim 3.

8. The method of claim 1, wherein encoding the second set comprises encoding a distance index for said second set.

9. The method of claim 1, wherein in the case where said first reference picture and a second reference picture are located at a same temporal side with respect to the current picture, said direction index for said second set is equal to said direction index encoded for said first set and wherein in the case where said first and second reference pictures are located at different temporal sides with respect to the current picture, said direction index for said second set is equal to an opposite of said direction index encoded for said first set.

10. The method of claim 1, wherein encoding the second set comprises encoding a distance index for said second set, said distance index for said second set being representative of a differential distance with respect to a distance represented by a distance index encoded for said first set.

11. The method of claim 8, wherein the distance index for said first set being representative of a distance in a set of N distances, said distance index for said second set is representative of a distance in a subset of said set of N distances, N being an integer.

12. The method of claim 3, wherein obtaining the second set of merge mode with motion vector difference indices for the second reference picture comprises decoding a distance index for said second set.

13. The method of claim 3, wherein in the case where said first and second reference pictures are located at a same temporal side with respect to the current picture, said direction index for said second set is equal to said direction index decoded for said first set and wherein in the case where said first and second reference pictures are located at different temporal sides with respect to the current picture, said direction index for said second set is equal to an opposite of said direction index decoded for said first set.

14. The method of claim 3, wherein obtaining the second set of merge mode with motion vector difference indices for the second reference picture comprises decoding a distance index for said second set, said distance index for said second set being representative of a differential distance with respect to a distance represented by a distance index decoded for said first set.

15. The method of claim 12, wherein the distance index for said first set being representative of a distance in a set of N distances, said distance index for said second set is representative of a distance in a subset of said set of N distances, N being an integer.

16. The apparatus of claim 2, wherein encoding the second set comprises encoding a distance index for said second set.

17. The apparatus of claim 2, wherein in the case where said first reference picture and a second reference picture are located at a same temporal side with respect to the current picture, said direction index for said second set is equal to said direction index encoded for said first set and wherein in the case where said first and second reference pictures are located at different temporal sides with respect to the current picture, said direction index for said second set is equal to an opposite of said direction index encoded for said first set.

18. The apparatus of claim 2, wherein encoding the second set comprises encoding a distance index for said second set, said distance index for said second set being representative of a differential distance with respect to a distance represented by a distance index encoded for said first set.

19. The apparatus of claim 16, wherein the distance index for said first set being representative of a distance in a set of N distances, said distance index for said second set is representative of a distance in a subset of said set of N distances, N being an integer.

20. The apparatus of claim 4, wherein obtaining the second set of merge mode with motion vector difference indices for the second reference picture comprises decoding a distance index for said second set.

21. The apparatus of claim 4, wherein in the case where said first and second reference pictures are located at a same temporal side with respect to the current picture, said direction index for said second set is equal to said direction index decoded for said first set and wherein in the case where said first and second reference pictures are located at different temporal sides with respect to the current picture, said direction index for said second set is equal to an opposite of said direction index decoded for said first set.

22. The apparatus of claim 4, wherein obtaining the second set of merge mode with motion vector difference indices for the second reference picture comprises decoding a distance index for said second set, said distance index for said second set being representative of a differential distance with respect to a distance represented by a distance index decoded for said first set.

23. The apparatus of claim 20, wherein the distance index for said first set being representative of a distance in a set of N distances, said distance index for said second set is representative of a distance in a subset of said set of N distances, N being an integer.

* * * * *